(12) United States Patent
Kihira et al.

(10) Patent No.: US 11,228,104 B2
(45) Date of Patent: Jan. 18, 2022

(54) CALIBRATION DEVICE AND CALIBRATION METHOD OF ARRAY ANTENNA, ARRAY ANTENNA, AND PROGRAM STORAGE MEDIUM

(71) Applicant: Mitsubishi Electric Corporation, Tokyo (JP)

(72) Inventors: Kazunari Kihira, Tokyo (JP); Toru Fukasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/259,767

(22) PCT Filed: Jul. 24, 2018

(86) PCT No.: PCT/JP2018/027683
§ 371 (c)(1),
(2) Date: Jan. 12, 2021

(87) PCT Pub. No.: WO2020/021628
PCT Pub. Date: Jan. 30, 2020

(65) Prior Publication Data
US 2021/0344111 A1    Nov. 4, 2021

(51) Int. Cl.
*H01Q 3/26*        (2006.01)
*H04B 17/12*       (2015.01)
(Continued)

(52) U.S. Cl.
CPC ............. *H01Q 3/267* (2013.01); *H04B 17/12* (2015.01); *H04B 17/14* (2015.01); *H04B 17/18* (2015.01)

(58) Field of Classification Search
CPC ........ H04B 17/12; H04B 17/14; H04B 17/18; H01Q 3/267
See application file for complete search history.

(56) References Cited

U.S. PATENT DOCUMENTS 9,294,177 B2 *   3/2016   Wang ........................ H04B 1/56
9,642,107 B1 *   5/2017   Chen .................... H04B 7/2041
(Continued)

FOREIGN PATENT DOCUMENTS

| JP | 3673732 B2 | 7/2005 |
| JP | 2011-106858 A | 6/2011 |
| JP | 5725703 B2 | 5/2015 |

OTHER PUBLICATIONS

Extended European Search Report for European Application No. 18928128.0. dated May 31, 2021.
(Continued)

*Primary Examiner* — Dominic E Rego
(74) *Attorney, Agent, or Firm* — Birch, Stewart, Kolasch & Birch, LLP

(57) ABSTRACT

A calibration device of an array antenna is for a transmission means including a plurality of antenna elements and transmission signal processing systems corresponding to the plurality of antenna elements, in which an antenna element transmission signal is calibrated for amplitude and phase differences and a time difference for each of the antenna elements on the basis of a transmission signal calibrating value, the transmission means being for generating a plurality of transmission radio waves applied with amplitude and phase differences and a time difference corresponding to each of the plurality of antenna elements and emitting the transmission radio waves from the respective antenna elements, the calibration device including: a multicarrier calibration signal generating means for generating a plurality of calibration signals based on, in correspondence, a plurality of subcarriers including a first frequency unit of a subcarrier to which a subcarrier symbol is assigned and a second frequency unit not assigned a subcarrier symbol, the plurality of calibration signals being different for each of the plurality of antenna elements; injection means for injecting (Continued)

a plurality of calibration signals generated by the multicarrier calibration signal generating means into the transmission means in one-to-one correspondence to the transmission signal processing systems of the plurality of antenna elements; extraction means for extracting calibration signals processed by the transmission signal processing systems of the plurality of antenna elements; a demultiplexing means for demultiplexing the calibration signals, for the respective antenna elements, extracted by the extraction means into a frequency unit of an assigned subcarrier and a frequency unit not assigned as a subcarrier; and a calibration processing means for obtaining a calibration value for calibrating the amplitude and phase differences and the time difference between the transmission signal processing systems of the plurality of antenna elements using the signals demultiplexed by the demultiplexing means, and providing the transmission signal calibrating value based on the obtained calibration value to the transmission means.

13 Claims, 12 Drawing Sheets

(51) Int. Cl.
*H04B 17/14* (2015.01)
*H04B 17/18* (2015.01)

(56) References Cited

U.S. PATENT DOCUMENTS

| | | | | |
|---|---|---|---|---|
| 2001/0005685 | A1* | 6/2001 | Nishimori | H01Q 3/2605 455/562.1 |
| 2003/0142012 | A1* | 7/2003 | Hirabe | H01Q 3/267 342/173 |
| 2004/0085929 | A1* | 5/2004 | Azuma | H04B 17/12 370/329 |
| 2004/0171408 | A1* | 9/2004 | Maruta | H04B 17/14 455/562.1 |
| 2005/0220003 | A1* | 10/2005 | Palaskas | H04B 1/30 370/210 |
| 2006/0227851 | A1* | 10/2006 | Shattil | H04B 1/7174 375/133 |
| 2008/0261534 | A1* | 10/2008 | Wang | H04W 52/04 455/67.11 |
| 2008/0310529 | A1* | 12/2008 | Futatsugi | H04L 27/2602 375/260 |
| 2009/0041092 | A1* | 2/2009 | Kim | H04L 5/0037 375/146 |
| 2010/0093282 | A1* | 4/2010 | Martikkala | H04B 17/364 455/63.4 |
| 2011/0134001 | A1* | 6/2011 | Sakata | H01Q 3/267 343/703 |
| 2012/0087230 | A1* | 4/2012 | Guo | H01Q 3/267 370/208 |
| 2013/0244586 | A1* | 9/2013 | Nabar | H04W 72/1226 455/69 |
| 2013/0329841 | A1* | 12/2013 | Keegan | G01S 19/36 375/350 |
| 2014/0269554 | A1 | 9/2014 | Shapira et al. | |
| 2019/0222406 | A1* | 7/2019 | Wang | H04L 25/0224 |

OTHER PUBLICATIONS

Kihira et al., "Fast Measurement Technique Using Multicarrier Signal for Transmit Array Antenna Calibration", 2013 Proceedings of the International Symposium on Antennas & Propagation, vol. 1, Oct. 23, 2013, pp. 398-399.

* cited by examiner

Calibration Signal

Extracted Synthesized Signal

CALIBRATION DEVICE AND CALIBRATION METHOD OF ARRAY ANTENNA, ARRAY ANTENNA, AND PROGRAM STORAGE MEDIUM

TECHNICAL FIELD

The present invention relates to a calibration device and a calibration method of an array antenna, an array antenna, and a program.

BACKGROUND ART

In an array antenna having a large number of antenna elements, calibration technology is indispensable for grasping and correcting the amplitude phase characteristics of each antenna element. For example, a calibration device of an array antenna disclosed in Patent Literature 1 is proposed.

Patent Literature 1 discloses an array antenna that performs digital beamforming, in which different subcarriers are assigned to each antenna element to generate a calibration signal, thereby simultaneously measuring the pass-amplitude phase characteristics of a plurality of elements and performing calibration of the amplitude and the phase on each antenna element.

CITATION LIST

Patent Literature

Patent Literature 1: JP 2011-106858 A

SUMMARY OF INVENTION

Technical Problem

However, in a case where a wideband signal is used as a transmission signal, the influence of a delay time difference (timing variation) for each antenna element is not negligible, and there is a disadvantage in the array antenna described in Patent Literature 1 that the influence of the timing synchronization accuracy in a digital to analog (D/A) converter included in each antenna element is unavoidable and thus a lot of time is required for adjustment of the difference.

The present invention has been made in view of the above points, and an object of the invention is to obtain a calibration device of an array antenna capable of simultaneously measuring the pass delay characteristics together with the pass-amplitude phase characteristics among transmission signal processing systems of a plurality of antenna elements.

Solution to Problem

A calibration device of an array antenna according to the present invention is for a signal processing means including a plurality of antenna elements and signal processing systems corresponding to the plurality of antenna elements, in which amplitude and phase differences and a time difference of data signals input to the signal processing systems are calibrated on the basis of a data signal calibrating value for each of the plurality of antenna elements, the calibration device including: a multicarrier calibration signal generating means for generating a plurality of calibration signals based on, in one-to-one correspondence, a plurality of subcarriers including a first frequency unit of a subcarrier to which a subcarrier symbol is assigned and a second frequency unit not assigned a subcarrier symbol, the plurality of calibration signals being different for each of the plurality of antenna elements; an injection means for injecting a plurality of calibration signals generated by the multicarrier calibration signal generating means into input ends of the signal processing systems in one-to-one correspondence to the signal processing systems of the plurality of antenna elements; an extraction means for extracting calibration signals processed by the signal processing systems of the plurality of antenna elements; a demultiplexing means for demultiplexing the calibration signals extracted by the extraction means into the first frequency unit of the assigned subcarrier and the second frequency unit not assigned as a subcarrier; and a calibration processing means for obtaining a calibration value for calibrating the amplitude and phase differences and the time difference between the signal processing systems of the plurality of antenna elements using the signals demultiplexed by the demultiplexing means, and providing the data signal calibrating value based on the obtained calibration value to the signal processing means.

Advantageous Effects of Invention

According to the present invention, it is possible to simultaneously measure the pass-amplitude phase characteristics among signal processing systems of a plurality of antenna elements as well as the pass delay characteristics, and there is an effect that calibration corresponding to a transmission radio wave emitted from the plurality of antenna elements is improved.

DESCRIPTION OF EMBODIMENTS

To describe the present invention further in detail, embodiments for carrying out the invention will be described below with reference to the accompanying drawings.

First Embodiment

An array antenna according to a first embodiment of the invention will be described with reference to FIGS. 1 to 8.

The array antenna according to the first embodiment is a transmission digital beamforming antenna using orthogonal frequency division multiplexing (OFDM) signals.

Figure 1:
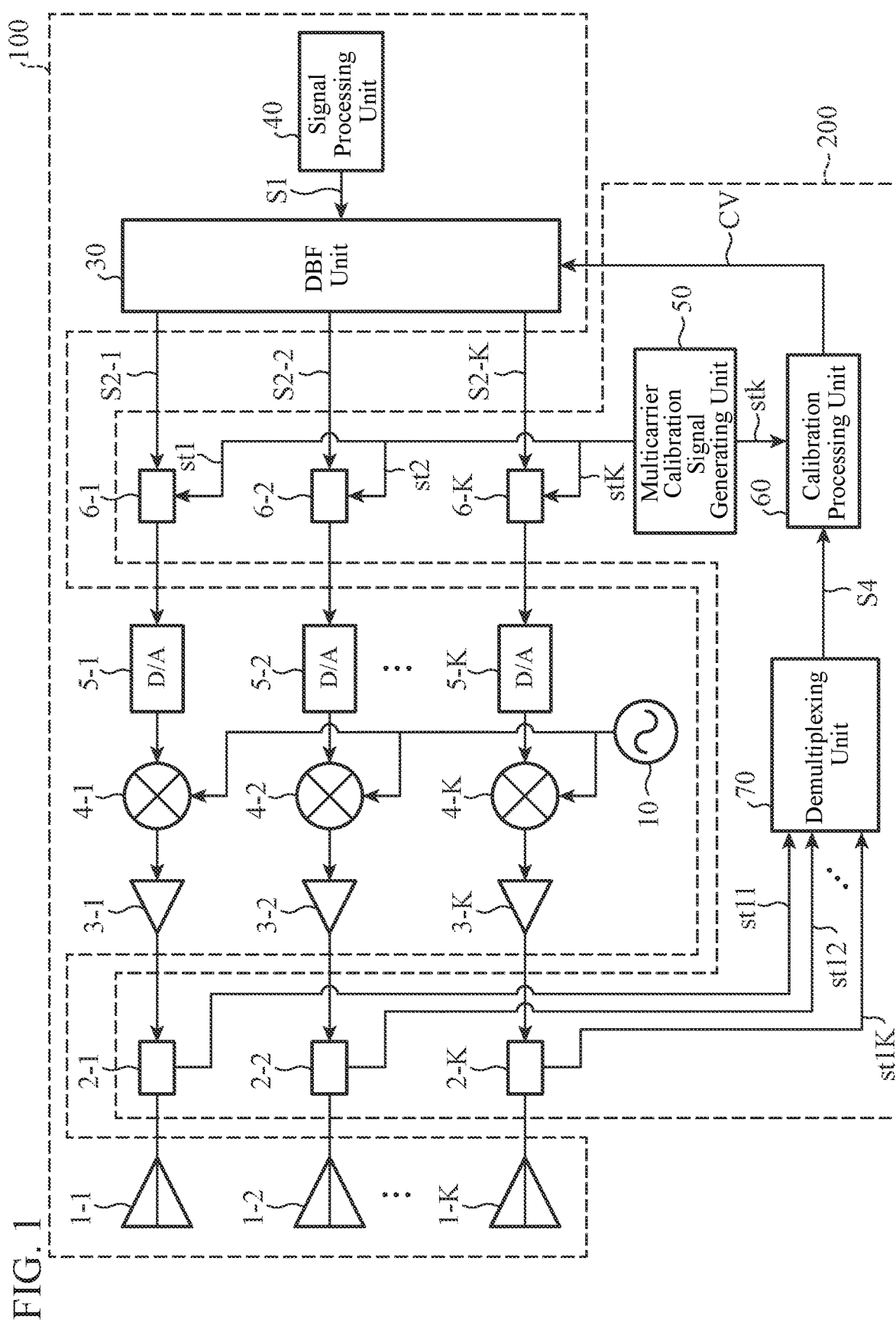
FIG. 1 is a configuration diagram illustrating an array antenna according to a first embodiment of the invention.

In FIG. 1, the array antenna is a data signal processing system that emits a transmission radio wave from a plurality of antenna elements 1-1 to 1-K, and includes a transmission means 100 which is a signal processing means, and a calibration device 200 for providing, to the transmission means 100, a transmission signal calibrating value CV which is a data signal calibrating value for calibrating amplitude and phase differences and time differences, among transmission signal processing systems of the plurality of antenna elements, of transmission signals corresponding to the plurality of antenna elements.

The calibration device 200 is operated at the time of pre-shipment adjustment of the array antenna to obtain the transmission signal calibrating value CV. Moreover, even after installation of the array antenna, a highly reliable array antenna can be obtained by operating the calibration device 200 in a flexible manner such as during the system operation, at suspension, or at maintenance.

The plurality of (K) antenna elements 1-1 to 1-K will be described below as antenna elements 1-$k$ as representatives in order to eliminate the complexity of description. Note that $k$ is a natural number from 1 to K, and K is a natural number greater than or equal to 2.

The transmission means 100 includes the plurality of antenna elements 1-$k$, a signal processing unit 40, a digital beamforming (hereinafter referred to as DBF) unit 30, a plurality of digital to analog (hereinafter referred to as DA) conversion units 5-1 to 5-K, a plurality of up converter (hereinafter referred to as UC) units 4-1 to 4-K, a plurality of amplification units 3-1 to 3-K, and a local oscillator (hereinafter referred to as an LO unit) 10.

The plurality of DA conversion units 5-1 to 5-K, the plurality of UC units 4-1 to 4-K, and the plurality of amplification units 3-1 to 3-K are also described as DA converting units 5-$k$, UC units 4-$k$, and amplification units 3-$k$, respectively, similarly to the plurality of antenna elements 1-$k$.

The plurality of DA conversion units 5-$k$, the plurality of UC units 4-$k$, and the plurality of amplification units 3-$k$ are provided in correspondence to the plurality of antenna elements 1-$k$, and are connected in the above order from the DBF unit 30 to the plurality of antenna elements 1-$k$, thereby forming K transmission signal processing systems.

The calibration device 200 includes a multicarrier calibration signal generating unit 50, a plurality of injection units 6-1 to 6-K, a plurality of extraction units 2-1 to 2-K, a demultiplexing unit 70, and a calibration processing unit 60.

The plurality of injection units 6-1 to 6-K and the plurality of extraction units 2-1 to 2-K are also described as injection units 6-$k$ and extraction units 2-$k$, respectively, similarly to the plurality of antenna elements 1-$k$.

Note that the multicarrier calibration signal generating unit 50, the plurality of injection units 6-$k$, the plurality of extraction units 2-$k$, the demultiplexing unit 70, and the calibration processing unit 60 compose a multicarrier calibration signal generating means, an injection means, an extraction means, a demultiplexing means, and a calibration processing means, respectively.

The plurality of injection units 6-$k$ and the plurality of extraction units 2-$k$ are provided in correspondence to the plurality of antenna elements 1-$k$, and are inserted into the respective transmission signal processing systems.

The plurality of injection units 6-$k$ is arranged between the DBF unit 30 and the DA conversion units 5-$k$ of the respective transmission signal processing systems. The plurality of extraction units 2-$k$ are arranged between the amplification unit 3-$k$ of the respective transmission signal processing systems, which are preceding stages of the plurality of antenna elements 1-$k$ of the respective transmission signal processing systems, and the antenna elements 1-$k$ of the respective transmission signal processing systems.

In the transmission means 100, the signal processing unit 40 generates a baseband signal (digital modulation signal) which is a transmission signal S1. The signal processing unit 40 includes, for example, a semiconductor integrated circuit mounted with a CPU or a one-chip microcomputer.

The DBF unit 30 generates a plurality of antenna element transmission signals S2-$k$ corresponding to the plurality of antenna elements 1-$k$ from the transmission signal S1, which is the baseband signal generated by the signal processing unit 40.

Note that, similarly to the plurality of antenna elements 1-$k$, the plurality of antenna element transmission signals S2-$k$ represent the plurality of antenna element transmission signals S2-1 to S2-K.

Upon generation of the antenna element transmission signals S2-$k$, each of the antenna element transmission signals S2-$k$ becomes a baseband signal in which amplitude and phase differences and the delay amount (time difference) are adjusted on the basis of the transmission signal calibrating value CV given from the calibration device 200. That is, transmission signals, of which amplitude and phase differences and time differences among the plurality of antenna element transmission signals S2-$k$ are calibrated with respect to the antenna element transmission signals S2-$k$, are given.

That is, the DBF unit 30 is a unit that controls the beamforming function during operation, and has the function to adjust the amplitude and phase differences and the weight of the delay amount corresponding to each of the plurality of antenna elements 1-$k$ with respect to a transmission signal to be transmitted.

In other words, the DBF unit 30 composes a digital beamforming means for generating the plurality of antenna element transmission signals S2-$k$, of which amplitude and phase differences and time differences corresponding to each of the plurality of antenna elements 1-$k$ are calibrated, on the basis of the transmission signal calibrating value CV, with respect to the transmission signal S1, which is the baseband signal from the signal processing unit 40, and outputting the plurality of antenna element transmission signals S2-$k$.

Note that the transmission signal calibrating value CV provided from the calibration device 200 is stored in the DBF unit 30.

Figure 2:
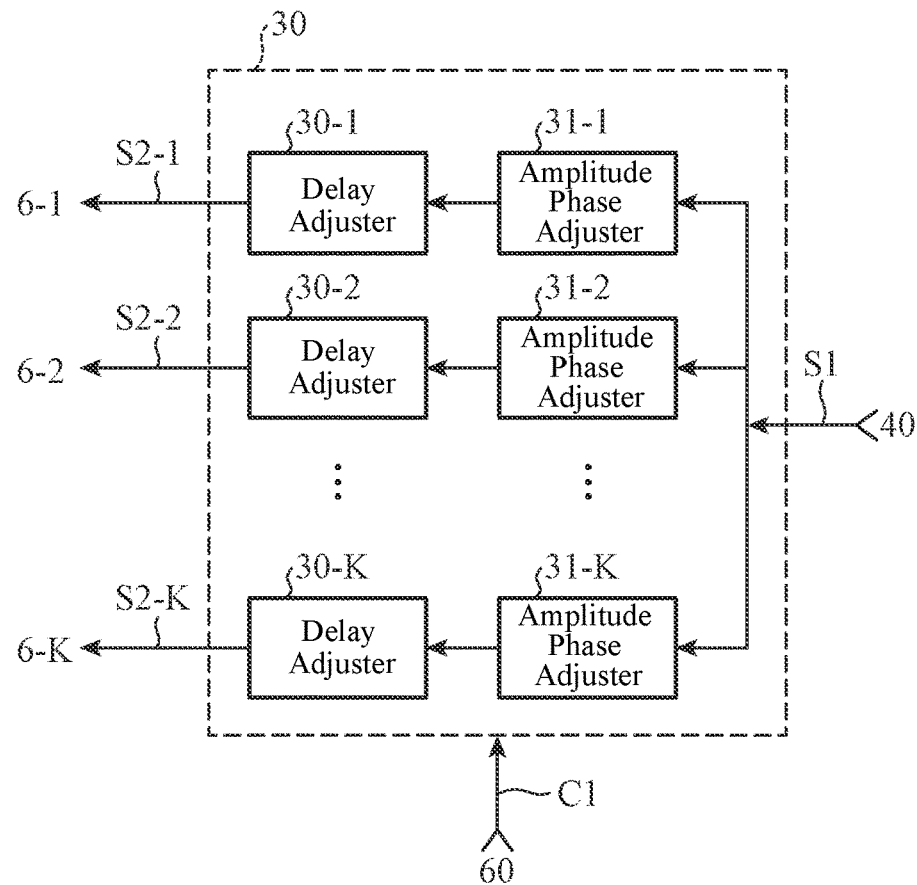
FIG. 2 is a configuration diagram illustrating a DBF unit 30 of the array antenna according to the first embodiment of the present invention.

As illustrated in FIG. 2, the DBF unit 30 includes a plurality of amplitude phase adjusters 31-$k$ and a plurality of delay adjusters 30-$k$ in correspondence with the plurality of antenna elements 1-$k$. Note that the plurality of amplitude phase adjusters 31-$k$ and the plurality of delay adjusters 30-$k$ represents, similarly to the plurality of antenna elements 1-$k$, a plurality of amplitude phase adjusters 31-1 to 31-K and a plurality of delay adjusters 30-1 to 30-K, respectively.

Each of the plurality of amplitude phase adjusters 31-$k$ adjusts the amplitude and phase differences of the transmission signal S1 generated by the signal processing unit 40 so that a beam is formed in a direction in which a transmission radio wave emitted from the plurality of antenna elements 1-$k$ is set, on the basis of the transmission signal calibrating value CV for calibrating the amplitude and phase differences, and generates a transmission signal in which the amplitude and phase differences are adjusted corresponding to the plurality of antenna elements 1-$k$.

Each of the plurality of delay adjusters 30-$k$ adjusts the time difference so that the plurality of antenna elements 1-$k$ emit, at the same timing, the transmission signals in which the amplitude and the phase are adjusted corresponding to the plurality of antenna elements 1-$k$ obtained by the plurality of amplitude phase adjusters 31-$k$ on the basis of the transmission signal calibrating value CV for calibrating the time differences.

That is, in order for the transmission signals input to the plurality of antenna elements 1-$k$ to be synchronized at the same timing and are input to the plurality of antenna elements 1-$k$, the delay adjusters 30-$k$ generates time-adjusted transmission signals by adjusting the timing errors, among the transmission signal processing systems of the plurality of antenna elements 1-$k$, of the transmission signals in which the amplitude and the phase are adjusted corresponding to the plurality of antenna elements 1-$k$ that are obtained in the amplitude phase adjusters 31-$k$, in correspondence with the plurality of antenna elements 1-$k$, and outputs the time-adjusted antenna element transmission signals S2-$k$ in which the amplitude and phase differences are also adjusted.

Since the transmission signals input to the plurality of antenna elements 1-$k$ are adjusted of the real-time delays in the plurality of delay adjusters 30-$k$, it is possible to form a wideband beam for the transmission radio waves emitted from the plurality of antenna elements 1-$k$.

Furthermore, it is possible to deal with a case where the DA conversion units 5-$k$ are not synchronized or where the sample timing varies.

The plurality of amplitude phase adjusters 31-$k$ and the plurality of delay adjusters 30-$k$ have correspondence to the plurality of transmission signal processing systems for the plurality of antenna elements 1-$k$.

Note that, in the first embodiment, the processing by the delay adjusters 30-$k$ is performed after the processing by the amplitude phase adjusters 31-$k$; however, conversely, the processing by the amplitude phase adjusters 31-$k$ may be performed after the processing by the delay adjusters 30-$k$.

Meanwhile, although the example has been illustrated in which the plurality of amplitude phase adjusters 31-$k$ and the plurality of delay adjusters 30-$k$ included in the DBF unit 30 are configured by dedicated hardware, the plurality of amplitude phase adjusters 31-$k$ and the plurality of delay adjusters 30-$k$ may be configured by, for example, a semiconductor integrated circuit mounted with a CPU or a one-chip microcomputer. In this case, the plurality of amplitude phase adjusters 31-$k$ and the plurality of delay adjusters 30-$k$ may be configured separately from the signal processing unit 40 or may be configured integrally.

The DBF unit 30 configured by a computer including a semiconductor integrated circuit mounted with a CPU or a one-chip microcomputer will be described with reference to FIG. 3.

Figure 3:
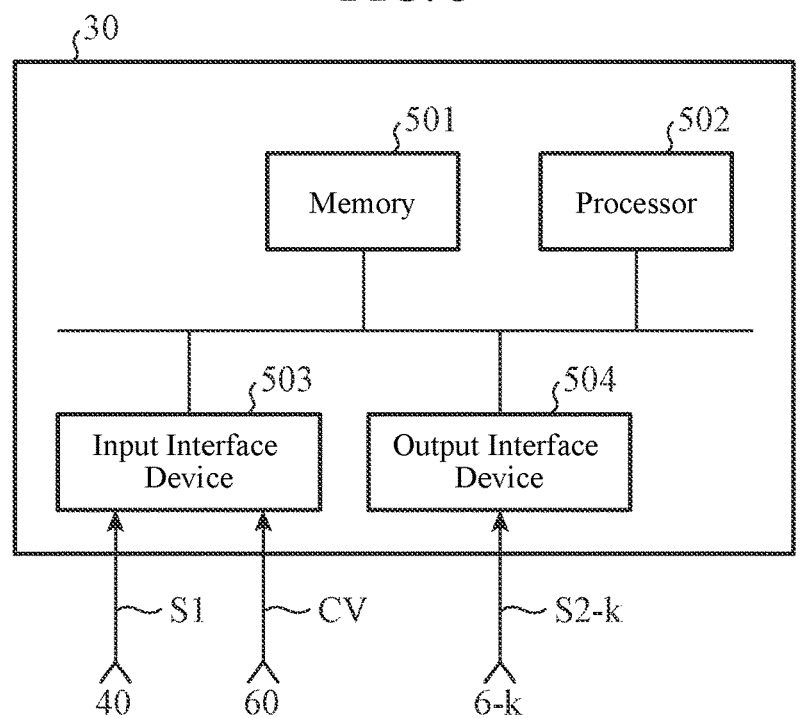
FIG. 3 is a diagram illustrating another example of the DBF unit 30 of the array antenna according to the first embodiment of the invention.

In FIG. 3, the DBF unit 30 includes a memory 501 including a storage unit such as a ROM and a RAM, a processor 502 such as a CPU, an input interface device 503, and an output interface device 504.

The processor 502 reads a program recorded in the memory 501 and executes processing.

The memory 501 stores a program describing the processing content of the plurality of amplitude phase adjusters 31-$k$ and the plurality of delay adjusters 30-$k$. The transmission signal calibrating value CV input from the calibration device 200 is also stored. Note that the transmission signal calibrating value CV is updated every time the calibration device 200 operates.

The input interface device 503 includes a signal input and output port such as a universal serial bus (USB) port or a serial port, is connected with the signal processing unit 40, and receives the transmission signal S1 output from the signal processing unit 40. The input interface device 503 is also connected to the calibration device 200, and receives the transmission signal calibrating value CV input from the calibration device 200.

The output interface device 504 includes a signal input and output port such as a USB port or a serial port, is connected with the plurality of injection units 6-$k$, and outputs respective antenna element transmission signals S2-$k$ to the plurality of injection units 6-$k$.

The program stored in the memory 501 performs the processing flow of an amplitude and phase adjusting step and a time adjusting step.

That is, in the amplitude and phase adjusting step, transmission signals in which the amplitude and phase differences are adjusted are generated from the transmission signal S1 generated by the signal processing unit 40 on the basis of the transmission signal calibrating value CV for calibrating the amplitude and phase differences that is generated in the calibration processing unit 60 of the calibration device 200 and is stored in the DBF unit 30 so that transmission radio waves emitted from the plurality of antenna elements 1-$k$ form a beam in a set direction.

In the time adjusting step, time-adjusted transmission signals are generated from the transmission signals, in which the amplitude and phase differences are adjusted, obtained in the amplitude and phase adjusting step on the basis of the transmission signal calibrating value CV for calibrating the time difference by adjusting the timing errors among the transmission signal processing systems of the plurality of antenna elements 1-$k$ in correspondence with the plurality of antenna elements 1-$k$ so that the transmission signals input to the plurality of antenna elements 1-$k$ are input to the plurality of antenna elements 1-$k$ at the same timing.

As a result, the time-adjusted antenna element transmission signals S2-$k$ in which the amplitude and phase differences are also adjusted are output from the output interface device 504 to the plurality of injection units 6-$k$.

The processing flow of the time adjusting step and the amplitude and phase adjusting step may be reversed.

In this case, in the time adjusting step, time-adjusted transmission signals are generated from the transmission signal S1 generated in the signal processing unit 40 by adjusting the timing errors among the transmission signal processing systems of the plurality of antenna elements 1-$k$ so that the transmission signals input to the plurality of antenna elements 1-$k$ are input to the plurality of antenna elements 1-$k$ at the same timing.

In the phase adjusting step, transmission signals in which the amplitude and phase differences are adjusted are generated from the time-adjusted transmission signals obtained in the time adjusting step so that transmission radio waves emitted from the plurality of antenna elements 1-$k$ form a beam in a set direction.

In other words, in the amplitude and phase adjusting step, transmission signals, in which the amplitude and phase differences of the transmission signal S1 are adjusted, are generated on the basis of the transmission signal calibrating value CV for calibrating the amplitude and phase differences, and the time adjusting step has a function of generating time-adjusted transmission signals from the transmission signal S1 on the basis of the transmission signal calibrating value CV for calibrating the time differences. Through both steps, the time-adjusted antenna element transmission signals S2-$k$, in which the amplitude and phase differences are also adjusted, are generated.

Each of the plurality of DA conversion units 5-$k$ is a DA convertor having the same structure, and converts a baseband signal from a digital value to an analog value. That is, each of the DA conversion units 5-$k$ converts, into an analog signal, a corresponding antenna element transmission signal S2-$k$ output from the DBF unit 30 in a data transmission mode, and a calibration signal stk injected by a corresponding injection unit 6-$k$ in a calibration mode. Note that the plurality of calibration signals stk represent the plurality of calibration signals stl to stK similarly to the plurality of antenna elements 1-$k$.

In other words, the plurality of DA conversion units 5-$k$ is included in a digital to analog conversion means for receiving the plurality of antenna element transmission signals S2-$k$ from the digital beamforming means including the DBF unit 30 and digital-to-analog converting the respective baseband signals of the plurality of antenna element transmission signals S2-$k$ from digital values to analog values in the data transmission mode, that is, when the array antenna is operated to emit transmission radio waves.

Each of the plurality of UC units 4-$k$ is an up converter having the same structure. Each of the plurality of UC units 4-$k$ frequency-converts an analog-converted signal from a corresponding DA conversion unit 5-$k$, that is, an analog-converted antenna element transmission signal S2-$k$ in the data transmission mode, and an analog-converted calibration signal stk in the calibration mode, into a radio frequency (RF) band on the basis of the oscillation frequency from the LO unit 10.

In other words, when the array antenna is operated, the plurality of UC units 4-$k$ is included in an up converter means for frequency-converting the respective antenna element transmission signals S2-$k$, which are converted from digital to analog by the digital to analog conversion means including the plurality of DA conversion units 5-$k$, into a radio frequency band.

Each of the plurality of amplification units 3-$k$ is an amplifier having the same structure. Each of the plurality of amplification units 3-$k$ power-amplifies a frequency-converted signal from a corresponding UC unit 4-$k$, that is, in the data transmission mode, an analog-converted and frequency-converted antenna element transmission signal S2-$k$, and in the calibration mode, an analog-converted and frequency-converted calibration signal stk.

Signals power-amplified by the plurality of amplification units 3-$k$, that is, analog-converted, frequency-converted, and power-amplified antenna element transmission signals S2-$k$ are input to the respective antenna elements 1-$k$, and are emitted from the respective antenna elements 1-$k$ as transmission radio waves.

In other words, when the array antenna is operated, the plurality of amplification units 3-$k$ compose an amplification means for power-amplifying each of the plurality of antenna element transmission signals S2-$k$ that are frequency-converted by the up converter means including the plurality of UC units 4-$k$, and outputting the plurality of antenna element transmission signals S2-$k$ power-amplified to the respective antenna elements 1-$k$.

Next, each component of the calibration device 200 will be described.

The multicarrier calibration signal generating unit 50 generates calibration signals stk of multiple carriers.

The multicarrier calibration signal generating unit 50 composes the multicarrier calibration signal generating means for generating a plurality of calibration signals stk each based on multicarrier signals to which a plurality of subcarriers is assigned, the subcarriers being different for each of the plurality of antenna elements 1-$k$, and including a first frequency unit of a subcarrier to which one of the plurality of antenna elements 1-$k$ is assigned and a second frequency unit not assigned as a subcarrier.

In the first embodiment, the multicarrier signals for the calibration signals stk use, in particular, orthogonal frequency division multiplexing (ODFM) signals which include two or more data symbols arranged at orthogonal frequency intervals.

Figure 4:
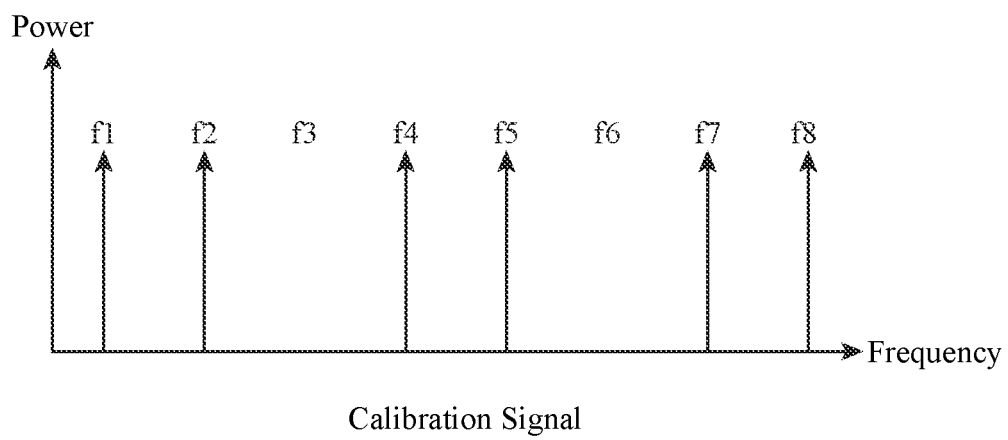
FIG. 4 is a diagram illustrating a basic structure of a plurality of subcarriers generated in a multicarrier calibration signal generating unit 50 of the array antenna according to the first embodiment of the invention.

Furthermore, in the basic structure of a plurality of subcarriers in the first embodiment, as illustrated in FIG. 4, eight subcarriers f1 to f8 are used, and a first frequency unit in which a subcarrier symbol is assigned to six subcarriers of f1, f2, f4, f5, f7, and f8 and a second frequency unit in which no subcarrier symbol is assigned to two subcarriers f3 and f5 (referred to as a null carrier) are included.

In FIG. 4, the horizontal axis represents the frequency, the vertical axis represents the power, and a vertical arrow represents a subcarrier symbol.

Figure 5:
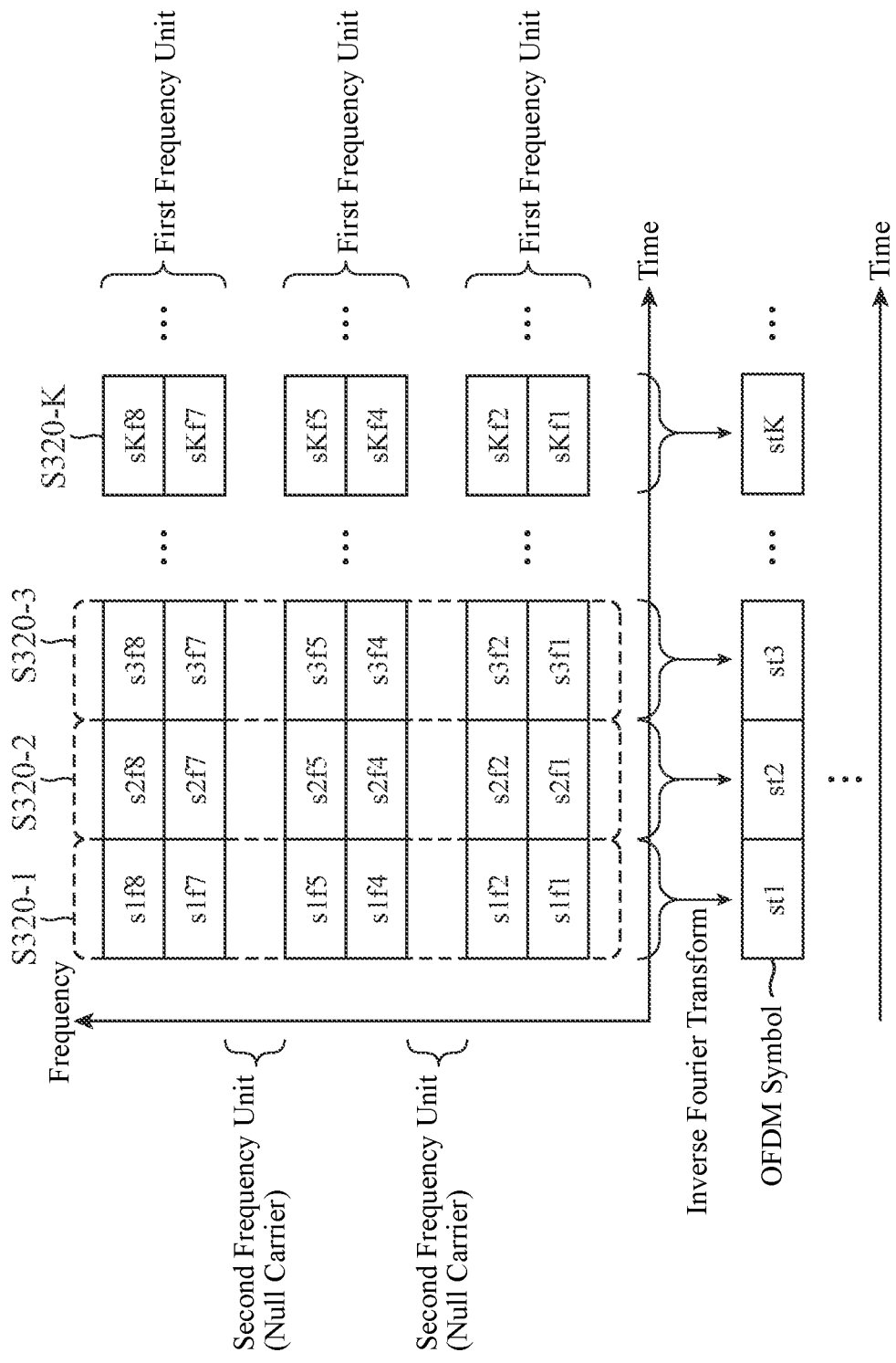
FIG. 5 is a diagram illustrating multicarrier signals $320\text{-}k$ and calibration signals stk generated in the multicarrier calibration signal generating unit 50 of the array antenna according to the first embodiment of the invention.

In addition, multicarrier signals 320-$k$ for the calibration signals stk include, as illustrated in the upper stage of FIG. 5, the subcarriers f1, f2, f4, f5, f7, and f8 included in the first frequency units assigned with subcarrier symbols skf1, skf2, skf4, skf5, skf7, and skf8 and the subcarriers f3 and f5 included in the second frequency unit that is a set of null carriers. The multicarrier signals 320-$k$ represents a plurality of multicarrier signals 320-1 to 320-K, similarly to the plurality of antenna elements 1-$k$.

In the upper stage in FIG. 5, the horizontal axis represents time and the vertical axis represents frequency.

In the first embodiment, subcarrier symbols skf1, skf2, skf4, skf5, skf7, and skf8 are data different in the time direction. That is, the amplitudes or the phases of the subcarrier symbols s1/1 to sKf1 are each modified, the amplitudes or the phases of the subcarrier symbols s1/2 to sKf2 are each modified, and similarly, the amplitude or the phase are each modified in the subcarrier symbols skf4, skf5, skf7, and skf8. Note that this is merely an example, but in an extreme example, the amplitudes or the phases of the subcarrier symbols skf1, skf2, skf4, skf5, skf7, and skf8 may be all the same; however, they are preferably different.

Note that, in the first embodiment, the number of subcarriers is eight and the subcarriers of null carriers are f3 and f5; however, the number and arrangement of subcarriers are not limited thereto, and can be freely selected within a frequency band to be calibrated.

Furthermore, the subcarrier symbols skf1, skf2, skf4, skf5, skf7, and skf8 may be any modulation signals such as phase-modulated signals, or may be continuous waves (CW waves).

The plurality of multicarrier signals 320-$k$ structured in this manner generates a multicarrier calibration signals stk by converting the frequency-domain signals arranged among the subcarriers into time-domain signals by inverse Fourier transform. As illustrated in the lower stage of FIG. 5, calibration signals stk including a plurality of OFDM symbols as time-domain signals are injected and output to/from the plurality of injection units 6-$k$.

The plurality of injection units 6-$k$ injects the plurality of calibration signals stk from the multicarrier calibration signal generating unit 50 into input ends of the transmission signal processing systems of the plurality of antenna elements 1-$k$. The plurality of injection units 6-$k$ composes the injection means for injecting the calibration signals stk from the multicarrier calibration signal generating unit 50 into the transmission means 100 in correspondence with the transmission signal processing systems of the plurality of antenna elements 1-$k$.

The plurality of injection units 6-$k$ are illustrated in FIG. 1 so that the calibration signal system and the transmission signal processing system are independently illustrated, in which physical switching is performed between the transmission signal processing system for transmitting the plurality of antenna element transmission signals S2-$k$ from the DBF unit 30 to the plurality of DA conversion units 5-$k$ and the calibration signal system for transmitting the plurality of calibration signals stk from the multicarrier calibration signal generating unit 50 to the plurality of DA conversion units 5-$k$.

However, since the plurality of injection units 6-$k$ can be executed by digital processing, instead of physically switching, it suffices to replace the plurality of antenna element transmission signals S2-$k$ from the DBF units 30 with the calibration signals stk from the multicarrier calibration signal generating unit 50 as signals to be transmitted to the DA conversion units 5-$k$. Therefore, performing such signal replacement by means of software eliminates the risk of frequency characteristics that are unique to hardware affecting the calibration accuracy due to the use of hardware such as switches or directional couplers.

Similarly to the antenna element transmission signals S2-$k$ from the DBF unit 30, the calibration signals stk from the multicarrier calibration signal generating unit 50 that are transmitted to the DA conversion unit 5-$k$ are converted from digital to analog in the DA conversion units 5-$k$, frequency-converted in the UC unit 4-$k$, power-amplified in the amplification unit 3-$k$, and then output.

The plurality of extraction units 2-$k$ is in the preceding stage of the plurality of antenna elements 1-$k$ and extracts a plurality of extraction calibration signals corresponding to the respective antenna elements 1-$k$, that is, a plurality of calibration signals stlk output from the plurality of amplification units 3-$k$.

The plurality of extraction units 2-$k$ are hardware extractors such as directional couplers or switches since the plurality of calibration signals stlk which are input are analog signals in a radio frequency (RF) band.

Therefore, in the preceding stage of the plurality of antenna elements 1-$k$, the plurality of extraction units 2-$k$ compose in an extraction means for extracting extraction calibration signals corresponding to the respective antenna elements 1-$k$, that is, the plurality of calibration signals stlk output from the amplification means including the plurality of amplification units 3-$k$.

That is, the plurality of extraction units 2-$k$ compose the extraction means for extracting the calibration signals stlk processed by the transmission signal processing systems of the plurality of antenna elements 1-$k$.

The demultiplexing unit 70 demultiplexes the extraction calibration signals for the respective antenna elements 1-$k$ extracted by the plurality of extraction units 2-$k$, that is, the plurality of calibration signals stlk, into the first frequency unit of the assigned subcarriers and the second frequency unit that is not assigned as a subcarrier, and outputs an adjustment signal S4 to the calibration processing unit 60.

Figure 6:
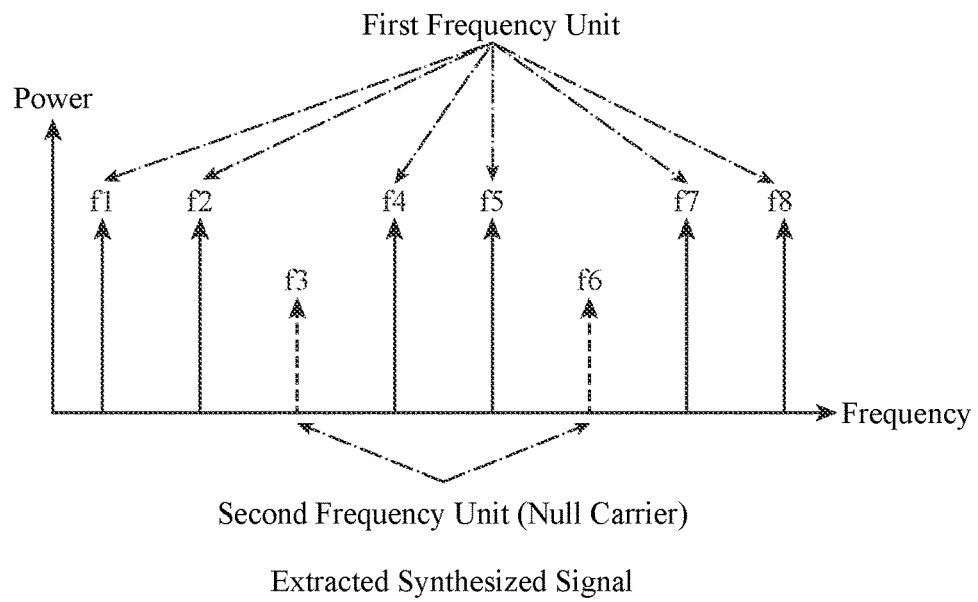
FIG. 6 is a diagram illustrating a synthesized signal generated by a demultiplexing unit 70 of the array antenna according to the first embodiment of the invention.

That is, the demultiplexing unit 70 detects the plurality of calibration signals stlk extracted by the plurality of extraction units 2-$k$, synthesizes the calibration signals to obtain a synthesized signal illustrated in FIG. 6, and obtains the adjustment signal S4 on the basis of the synthesized signal. In FIG. 6, the horizontal axis represents frequency, the vertical axis represents power, and the vertical arrows schematically represent the combined power of the subcarrier symbols skfp in the eight subcarriers f1 to f8. Note that p represents 1 to 8 of the subcarriers.

Figure 7:
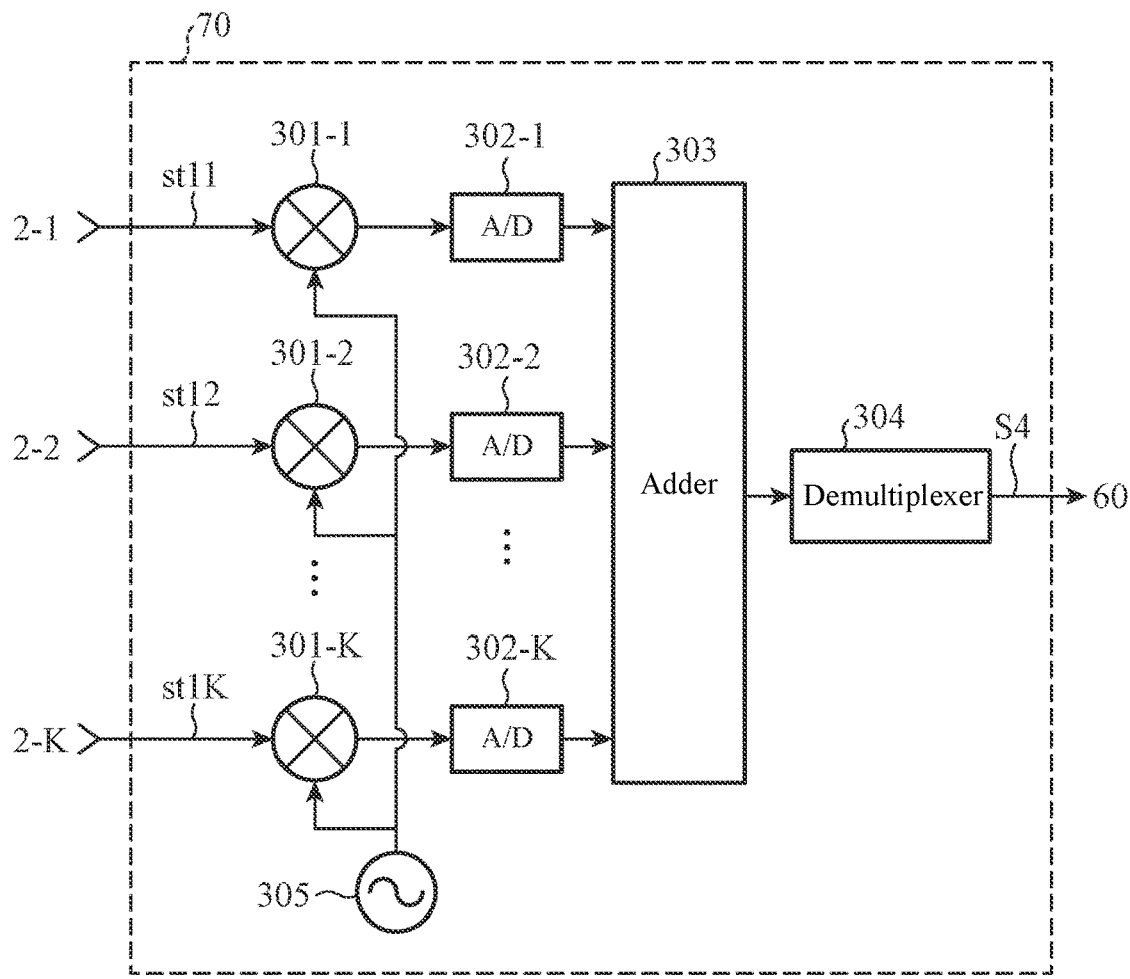
FIG. 7 is a configuration diagram illustrating the demultiplexing unit 70 of the array antenna according to the first embodiment of the invention.

Next, the specific configuration of the demultiplexing unit 70 will be described with reference to FIG. 7.

The demultiplexing unit 70 includes a plurality of down converter (hereinafter, referred to as DC) units 301-1 to 301-K, analog to digital (hereinafter, referred to as AD) conversion units 302-1 to 302-K, an adder 303, a demultiplexer 304, and a local oscillator (hereinafter referred to as LO unit) 305.

Similarly to the antenna elements 1-$k$, the plurality of DC units 301-1 to 301-K and the plurality of AD conversion units 302-1 to 302-K are described as DC units 301-$k$ and AD conversion units 302-$k$, respectively, as representatives.

Each of the plurality of DC units 301-$k$ is a down converter having the same structure. Each of the plurality of DC units 301-$k$ frequency-converts a calibration signal stlk extracted by the corresponding extraction unit 2-$k$ from a radio frequency (RF) band to the frequency band of the calibration signal stk output from the multicarrier calibration signal generating unit 50 on the basis of the oscillation frequency from the LO unit 305.

Each of the plurality of AD conversion units 302-$k$ performs analog to digital conversion on the calibration signals stlk that are frequency-converted in the plurality of DC units 301-$k$ from an analog value to a baseband digital value.

At this point, in a case where there is no delay difference (timing error) between the transmission signal processing systems of the plurality of antenna elements 1-$k$, the subcarrier symbols skfp of the calibration signals stlk are the same as the subcarrier symbols skfp of the calibration signals stk from the multicarrier calibration signal generating unit 50.

The adder 303 adds (synthesizes) the calibration signals stlk that are converted from analog to digital in the plurality of AD conversion units 302-$k$. The result of this addition (synthesis) is the signals illustrated in FIG. 6.

The synthesized value of f1 illustrated in FIG. 6 is a synthesized value of the subcarrier symbols skf1 corresponding to the frequency value of the subcarrier f1 of the calibration signals stk corresponding to the plurality of antenna elements 1-$k$, the synthesized value of f2 is the synthesized value of the subcarrier symbols skf2 corresponding to the frequency values of the subcarrier 12 of the calibration signals stk corresponding to the plurality of antenna elements 1-$k$, and the synthesized values of f3 to f8 are also obtained from similar additions.

Note that the subcarriers f3 and f6 originally do not appear as power even if they are synthesized since the calibration signals stk output from the multicarrier calibration signal generating unit 50 are null carriers.

In FIG. 6, it is indicated, in a case where there is a delay difference (timing error) between the transmission signal processing systems of the plurality of antenna elements 1-$k$, that inter-subcarrier interference (also referred to as an inter-block interference) by adjacent subcarrier symbols occurs, that the orthogonality of OFDM signals is distorted, and that a synthesized value has appeared in the subcarriers f3 and f6.

Note that, in the first embodiment, the distortion of orthogonality is used to detect the delay amount without using a cyclic prefix (also referred to as a guard interval) in which a part of the waveform is copied to the head of the data symbol.

The demultiplexer 304 performs Fourier transform on the synthesized calibration signal added by the adder 303, and demultiplexes into subcarrier units. The demultiplexed subcarriers are grouped into the first frequency unit to which subcarrier symbols are assigned and the second frequency unit to which no subcarrier symbols are assigned (null carriers), and are output to the calibration processing unit 60 as the adjustment signal S4.

The calibration processing unit 60 composes the calibration processing means for obtaining calibration values (amplitude and phase differences, delay amount) for calibrating the amplitude and phase differences and time differences between the transmission signal processing systems due to passage through the transmission signal processing systems of the plurality of antenna elements 1-$k$ using the adjustment signal S4 that is the signal demultiplexed in the demultiplexing unit 70 using the calibration signals stk generated in the multicarrier calibration signal generating unit 50 as reference values, and providing the transmission signal calibrating value CV based on the obtained calibration values to the DBF unit 30 in the transmission means 100.

The delay amount indicates that a time difference appears between the transmission signal processing systems of the plurality of antenna elements 1-$k$ from the time when the calibration signals stk have been injected into the transmission means 100 with the adjustment signal S4 indicating that the synthesized value appears in the frequency value in the subcarrier in the second frequency unit for the null carriers to the time when the calibration signals stlk are extracted from the transmission means 100.

That is, calibration values are estimated which adjust the time difference for each of the plurality of antenna elements 1-$k$ so that time adjustment that allows, ideally, all the time differences for the respective antenna elements 1-$k$ to be at the same timing is implemented and that the output power of the demultiplexed second frequency unit in the adjustment signal S4 is minimized as much as possible, and ideally to be zero.

In this case, the calibration values may be estimated so that the power value of the output power in the demultiplexed second frequency unit in the adjustment signal S4 is equal to or less than a set threshold value.

Meanwhile, the amplitude and phase difference indicates that amplitude and phase differences appear between the transmission signal processing systems of the plurality of antenna elements 1-$k$ from the comparison between the synthesized value in the adjustment signal S4, in which the synthesized value appears in the frequency value in the subcarrier in the first frequency unit to which a subcarrier symbol is assigned, and the synthesized value of the calibration signals stk generated in the multicarrier calibration signal generating unit 50.

That is, calibration values are estimated which adjust the amplitude and the phase for each of the plurality of antenna elements 1-$k$ so that the output power of the demultiplexed first frequency unit in the adjustment signal S4 is maximized as much as possible, and that, ideally, the amplitude and phase differences for each of the plurality of antenna elements 1-$k$ are adjusted to allow all the transmission radio waves emitted from the plurality of antenna elements 1-$k$ to form a beam in a set direction.

In this case, the calibration values may be estimated so that the power value of the output power in the demultiplexed first frequency unit in the adjustment signal S4 is equal to or greater than a set threshold value.

Therefore, in the calibration processing unit 60, it is possible to adjust the timing in the plurality of antenna element transmission signals S2-$k$ output from the DBF unit 30 by estimating the delay amount for each of the transmission signal processing systems including the plurality of antenna elements 1-$k$ whose synthesized value is ideally zero in the frequency value in the subcarrier of the second frequency unit to calculate the transmission signal calibrating value CV, and outputting the transmission signal calibrating value CV from the calibration processing unit 60 to the DBF unit 30, and as a result, no time difference is generated between beams based on the plurality of antenna element transmission signals S2-$k$ emitted from the plurality of antenna elements 1-$k$.

It is also possible to adjust the amplitude and phase differences in the plurality of antenna element transmission signals S2-$k$ output from the DBF unit 30 by estimating the delay amount for each of the transmission signal processing systems including the plurality of antenna elements 1-$k$ to calculate the transmission signal calibrating value CV so that the transmission radio waves emitted from the plurality of antenna elements 1-$k$ form a beam in a set direction, and outputting the transmission signal calibrating value CV from the calibration processing unit 60 to the DBF unit 30, and as a result, the transmission radio waves are emitted in appropriate directions by a beam based on the plurality of antenna element transmission signals S2-$k$ emitted from the plurality of antenna elements 1-$k$.

In other words, the transmission signal calibrating value CV relating to the delay amount is obtained by calculating the time difference at which the output power of the calibration signals in the second frequency unit is minimized.

Meanwhile, the transmission signal calibrating value CV relating to the amplitude and phase differences is obtained by calculating the amplitude and phase differences at which the output power of the calibration signals in the first frequency unit that is obtained by calibrating the time difference is maximized.

Although each component of the calibration device 200 is implemented by hardware, a part thereof may be a computer. That is, the calibration device 200 includes a memory including a storage unit, such as a ROM and a RAM, and a processor such as a CPU, and a program describing the processing content performed by the calibration device 200 is stored in the memory. The processor reads the program and executes the processing.

Figure 8:
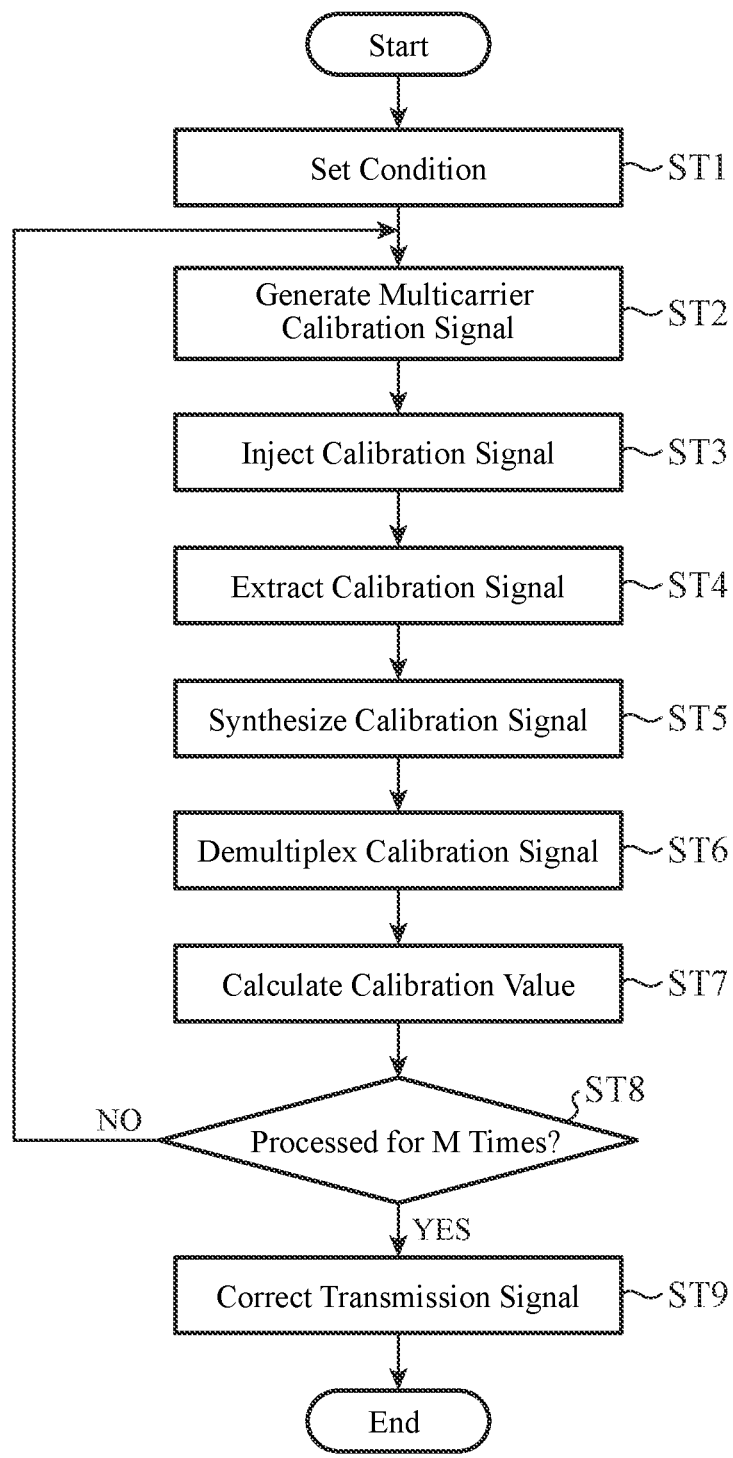
FIG. 8 is a flowchart illustrating a processing flow in a calibration device 200 of the array antenna according to the first embodiment of the invention.

The program stored in the memory is a program for executing the flowchart illustrating a processing flow of event recognition in the calibration device 200 illustrated in FIG. 8.

The flowchart illustrated in FIG. 8 includes a condition setting step ST1, a calibration signal stk generating step ST2, a calibration signal stk injecting step ST3, a calibration signal st1$k$ extracting step ST4, a calibration signal st1$k$ synthesizing step ST5, a synthesized calibration signal demultiplexing step ST6, a calibration value calculating step ST7, the processing count determining step ST8, and a transmission signal calibrating value CV generating step ST9.

Hereinafter, steps ST1 to ST8 will be described on the basis of the relationship with the components of the calibration device 200 illustrated in FIG. 1.

The condition setting step ST1 and the calibration signal stk generating step ST2 are controlled by the multicarrier calibration signal generating unit 50 in the configuration illustrated in FIG. 1.

In the condition setting step ST1, conditions related to the calibration process are set. That is, as illustrated in FIG. 5, the structure of the multicarrier signals 320-$k$ for the calibration signals stk is determined.

In the calibration signal stk generating step ST2, the calibration signals stk are generated according to the multicarrier signals 320-$k$ in which the condition has been set in the condition setting step ST1. That is, on the basis of the basic structure of the plurality of subcarriers illustrated in FIG. 4, the calibration signals stk including OFDM symbols are generated by converting the frequency domain signals of the multicarrier signals 320-$k$ set with the condition in the condition setting step ST1 into time domain signals by inverse Fourier transform.

The calibration signal stk injecting step ST3 is controlled by the injection units 6-$k$ in the configuration illustrated in FIG. 1.

In the calibration signal stk injecting step ST3, the calibration signals stk generated in the calibration signal stk generating step ST2 are injected into the DA conversion units 5-$k$ of the transmission means 100.

In the calibration signal stlk extracting step ST4, the calibration signals stk injected into the DA conversion units 5-$k$ are converted from digital to analog by the DA conversion units 5-$k$ included in the transmission signal processing systems, frequency-converted in the UC units 4-$k$, and power-amplified in the amplification units 3-$k$, and the calibration signals stlk that are output from the amplification units 3-$k$ are extracted.

The calibration signal stlk synthesizing step ST5 and the synthesized calibration signal demultiplexing step ST6 are controlled by the demultiplexing unit 70 in the configuration illustrated in FIG. 1.

In the calibration signal stlk synthesizing step ST5, the calibration signals stlk extracted in the calibration signal stlk extracting step ST4 are detected and synthesized. That is, all the calibration signals stlk corresponding to the plurality of antenna elements 1-$k$ are each frequency-converted and converted from analog to digital to obtain baseband digital signals, and then all the calibration signals stlk subjected to these processes are added (synthesized) by digital signal processing to generate the synthesized signal illustrated in FIG. 6.

In the synthesized calibration signal demultiplexing step ST6, the synthesized signal obtained in the calibration signal stlk synthesizing step ST5 is Fourier-transformed, demultiplexed into subcarrier units, and groups into the first frequency unit to which subcarrier symbols are assigned and the second frequency unit to which no subcarrier symbols are assigned (null carriers) are performed to generate the adjustment signal S4.

The calibration value calculating step ST7 is controlled by the calibration processing unit 60 in the configuration illustrated in FIG. 1.

In the calibration value calculating step ST7, calibration values (amplitude and phase difference, delay amount) are calculated using the adjustment signal S4 generated in the synthesized calibration signal demultiplexing step ST6, using the plurality of calibration signals stk generated in the calibration signal stk generating step ST2 as reference values.

In the processing count determining step ST8, whether or not steps ST2 to ST7 have been performed M times is determined. If the steps have not been performed M times, the procedure returns to the calibration signal stk generating step ST2 and is repeated. If the steps have been performed M times, the procedure proceeds to the transmission signal calibrating value CV generating step ST9.

By repeating steps ST2 to ST7 M times, the accuracy of calculation of the calibration values (amplitude and phase differences, delay amount) is improved.

In the transmission signal calibrating value CV generating step ST9, the transmission signal calibrating value CV is generated which is based on the final calibration values in the processing count determining step ST8.

The transmission signal calibrating value CV generated in the transmission signal calibrating value CV generating step ST9 is provided to the DBF unit 30 of the transmission means 100.

As a result, during normal operation of the transmission means 100, the plurality of antenna element transmission signals S2-$k$ from the DBF unit 30 are adjusted of the timing and the amplitude and phase differences by the transmission signal calibrating value CV, and then are output.

Since the DBF unit 30 is capable of adjusting the timing by delay processing of time samples by digital signal processing, and thus the time adjustment can be accurately performed.

Next, in the array antenna according to the first embodiment configured as described above, an operation for obtaining the transmission signal calibrating value CV, which is the calibration mode, will be mainly described.

Note that the calibration mode is only required to be performed at times of installation of the array antenna or maintenance of the array antenna, or may be performed immediately before the normal operation of the array antenna.

First, the multicarrier calibration signal generating unit 50 determines the structure of the plurality of multicarrier signals 320-$k$ for the plurality of calibration signals stk illustrated in FIG. 5, and generates the multicarrier calibration signal stk in accordance with the plurality of multicarrier signals 320-$k$.

The plurality of calibration signals stk generated by the multicarrier calibration signal generating unit 50 are injected into the plurality of DA conversion units 5-$k$ of the transmission means 100 by the plurality of injection units 6-$k$, converted from digital to analog by the plurality of DA conversion units 5-$k$, frequency-converted by the plurality of UC units 4-$k$, and power-amplified by the plurality of amplification units 3-$k$ that are included in the plurality of transmission signal processing systems.

The plurality of extraction units 2-$k$ extract the calibration signals stlk which is the output of the plurality of amplification units 3-$k$.

The plurality of calibration signals stlk extracted by the plurality of extraction units 2-$k$ are detected and synthesized by the demultiplexing unit 70 to generate the synthesized signal illustrated in FIG. 6. The demultiplexing unit 70 also performs Fourier transform on the synthesized signal, demultiplexer in subcarrier units, and groups into the first frequency unit to which subcarrier symbols are assigned and the second frequency unit to which no subcarrier symbols are assigned (null carriers) to generate the adjustment signal S4.

The adjustment signal S4 generated by the demultiplexing unit 70 is input to the calibration processing unit 60, and calibration values (amplitude and phase differences, delay amount) are obtained using the adjustment signal S4 that is the signal demultiplexed in the demultiplexing unit 70 using the calibration signals stk generated in the multicarrier calibration signal generating unit 50 as reference values, and the transmission signal calibrating value CV based on the obtained calibration values is provided to the DBF unit 30 in the transmission means 100.

Therefore, the calibration device 200 is capable of simultaneously measuring the pass delay characteristics as well as the pass-amplitude phase characteristics between the transmission signal processing systems of the plurality of antenna elements 1-$k$.

The transmission signal calibrating value CV generated in this manner is stored in the DBF unit 30.

During operation of the array antenna, that is, when the transmission radio waves are emitted from the plurality of antenna elements 1-$k$ in accordance with the transmission signals from the transmission means 100, the DBF unit 30 outputs the plurality of antenna element transmission signals S2-$k$ that are adjusted of the timing and the amplitude and phase differences by the transmission signal calibrating value CV, and thus the transmission radio waves emitted from the plurality of antenna elements 1-$k$ are adjusted of the amplitude and phase differences and the timing shift, and then are emitted.

The calibration device 200 of the array antenna according to the first embodiment configured as described above detects the amplitude and phase differences and the delay difference (timing error), which are characteristic variations among the transmission signal processing systems of the plurality of antenna elements 1-$k$, by utilizing the orthogonality of the multicarrier signals in the plurality of calibration signals stk generated by the multicarrier calibration signal generating unit 50, and thus there is an effect that the calibration values (amplitude and phase differences, delay amount) can be simultaneously obtained for all of the plurality of antenna elements 1-$k$.

Moreover, since the calibration values (amplitude and phase differences, delay amount) can be simultaneously obtained for all of the plurality of antenna elements 1-$k$, the calibration values (amplitude and phase differences, delay amount) are obtained before the array antenna is shipped, thereby enabling not only the adjustment of the amplitude and phase differences and timing shift in the transmission radio waves emitted from the plurality of antenna elements 1-$k$, but also flexible adjustment after installation such as during the operation or suspension of the array antenna. Therefore, in effect, a more reliable array antenna can be obtained.

Note that, in the array antenna according to the first embodiment, it is assumed that the plurality of calibration signals stk generated by the multicarrier calibration signal generating unit 50 is injected, as digital signals, into the plurality of DA conversion units 5-$k$ of the transmission means 100; however, the plurality of calibration signals stk may be injected as analog signals into the plurality of UC units 4-$k$ or the plurality of amplification units 3-$k$. That is, the arrangement of the injection units 6-$k$ and the form of the calibration signals stk, that is, whether the signals are digital or analog may be changed depending on the calibration range of the transmission means 100.

Note that the array antenna according to the first embodiment is a transmitting array antenna; however, the calibration device 200 illustrated in FIG. 1 is also applicable to a receiving array antenna. In a case of application to a receiving array antenna, the injection units 6-$k$ are arranged at input ends of reception signal processing systems of a plurality of reception antennas, and the extraction units 2-$k$ are arranged at output ends of the reception signal processing systems of the plurality of reception antennas, that is, the positions of the injection units 6-$k$ and the extraction units 2-$k$ illustrated in FIG. 1 are reversed. With this configuration, even in the receiving array antenna, calibration values (amplitude and phase differences, delay amount) for a receiving means, which is a signal processing means in the receiving array antenna, can be obtained similarly to the transmitting array antenna illustrated in FIG. 1, and the time delay and the amplitude and phase differences in reception signals by the plurality of reception antennas can be adjusted.

Second Embodiment

An array antenna according to a second embodiment of the invention will be described with reference to FIGS. 9 to 11.

A calibration device 200 of the array antenna according to the second embodiment of the invention is different only in that a plurality of calibration signals stlk extracted by a plurality of extraction units 2-$k$ is processed by a power combining unit 80 and then processed by a demultiplexing unit 71, whereas, in the calibration device 200 of the array antenna according to the first embodiment, the plurality of calibration signals stlk extracted by the plurality of extraction units 2-$k$ is input to the demultiplexing unit 70.

Figure 9:
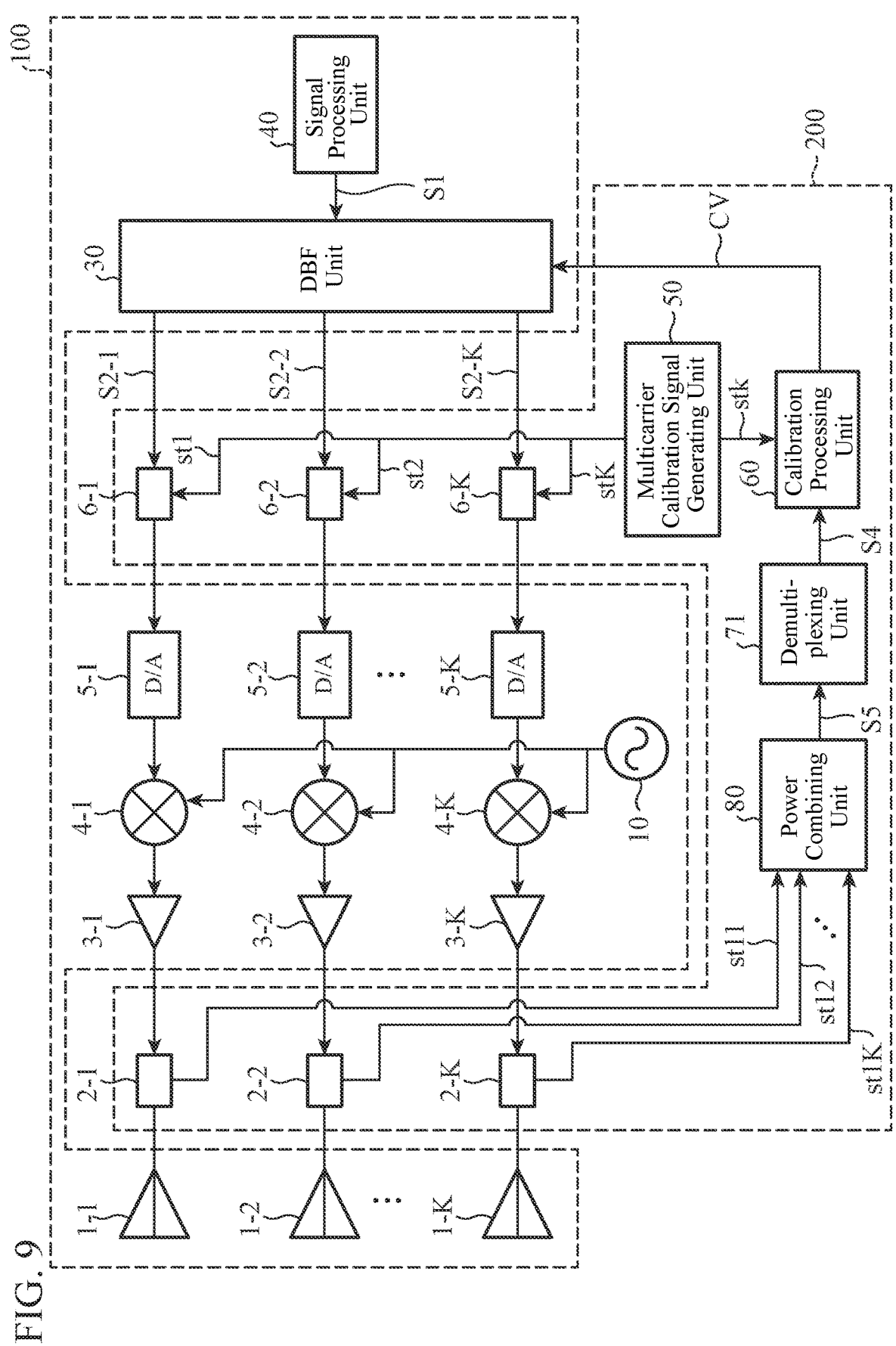
FIG. 9 is a configuration diagram illustrating an array antenna according to a second embodiment of the invention.
Figure 10:
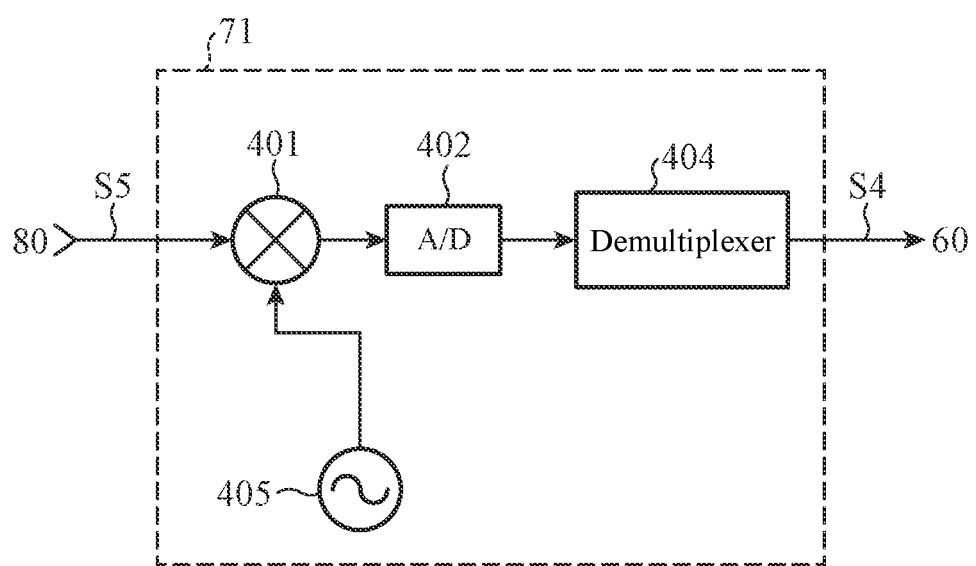
FIG. 10 is a configuration diagram illustrating a demultiplexing unit 71 of the array antenna according to the second embodiment of the invention.

Note that, in FIGS. 9 to 10, the same symbol as that in FIGS. 1 to 7 represents the same or a corresponding component.

Therefore, points different from the array antenna according to the first embodiment will be mainly described below.

The power combining unit 80 combines the power of a plurality of calibration signals stlk extracted by a plurality of extraction units 2-$k$ to generate a synthesized calibration signal S5. The plurality of calibration signals stlk is in a radio frequency (RF) band, and the power combining unit 80 performs the synthesis process in the radio frequency (RF) band.

The demultiplexing unit 71 demultiplexes the synthesized calibration signal S5 generated in the power combining unit 80 into a first frequency unit of an assigned subcarrier and a second frequency unit not assigned as a subcarrier, and outputs an adjustment signal S4 to the calibration processing unit 60.

The specific configuration of the demultiplexing unit 71 will be described with reference to FIG. 10.

The demultiplexing unit 71 includes a down converter (hereinafter, referred to as DC) unit 401, an analog to digital (hereinafter, referred to as AD) conversion unit 402, a demultiplexer 404, and an LO unit 405.

The DC unit 401 frequency-converts the synthesized calibration signal S5 generated in the power combining unit 80 from the radio frequency (RF) band to the frequency bands of calibration signals stk output from a multicarrier calibration signal generating unit 50 on the basis of the oscillation frequency from the LO unit 405.

The AD conversion unit 402 performs analog to digital conversion on the synthesized calibration signal S5 that are frequency-converted in the DC unit 401 from an analog value to a baseband digital value.

The demultiplexer 404 Fourier-transforms the synthesized calibration signal S5 that has been converted from analog to digital in the AD conversion unit 402, and demultiplexes into subcarrier units. The demultiplexed subcarriers are grouped into the first frequency unit to which subcarrier symbols are assigned and the second frequency unit to which no subcarrier symbols are assigned (null carriers), and are output to the calibration processing unit 60 as the adjustment signal S4.

The demultiplexing unit 71 in the second embodiment combines the power of the plurality of calibration signals stlk extracted by the plurality of extraction units 2-$k$ in the power combining unit 80 to generate a synthesized calibration signal S5, and thus the DC unit 401 and the AD conversion unit 402 can be implemented by a single down converter and a single AD converter, respectively, and the adder that controls the addition process implemented by the digital signal processing used in the first embodiment can be omitted, thereby enabling a simple configuration.

Although each component of the calibration device 200 is implemented by hardware, a part thereof may be a computer. That is, the calibration device 200 includes a memory including a storage unit, such as a ROM and a RAM, and a processor such as a CPU, and a program describing the processing content performed by the calibration device 200 is stored in the memory. The processor reads the program and executes the processing.

Figure 11:
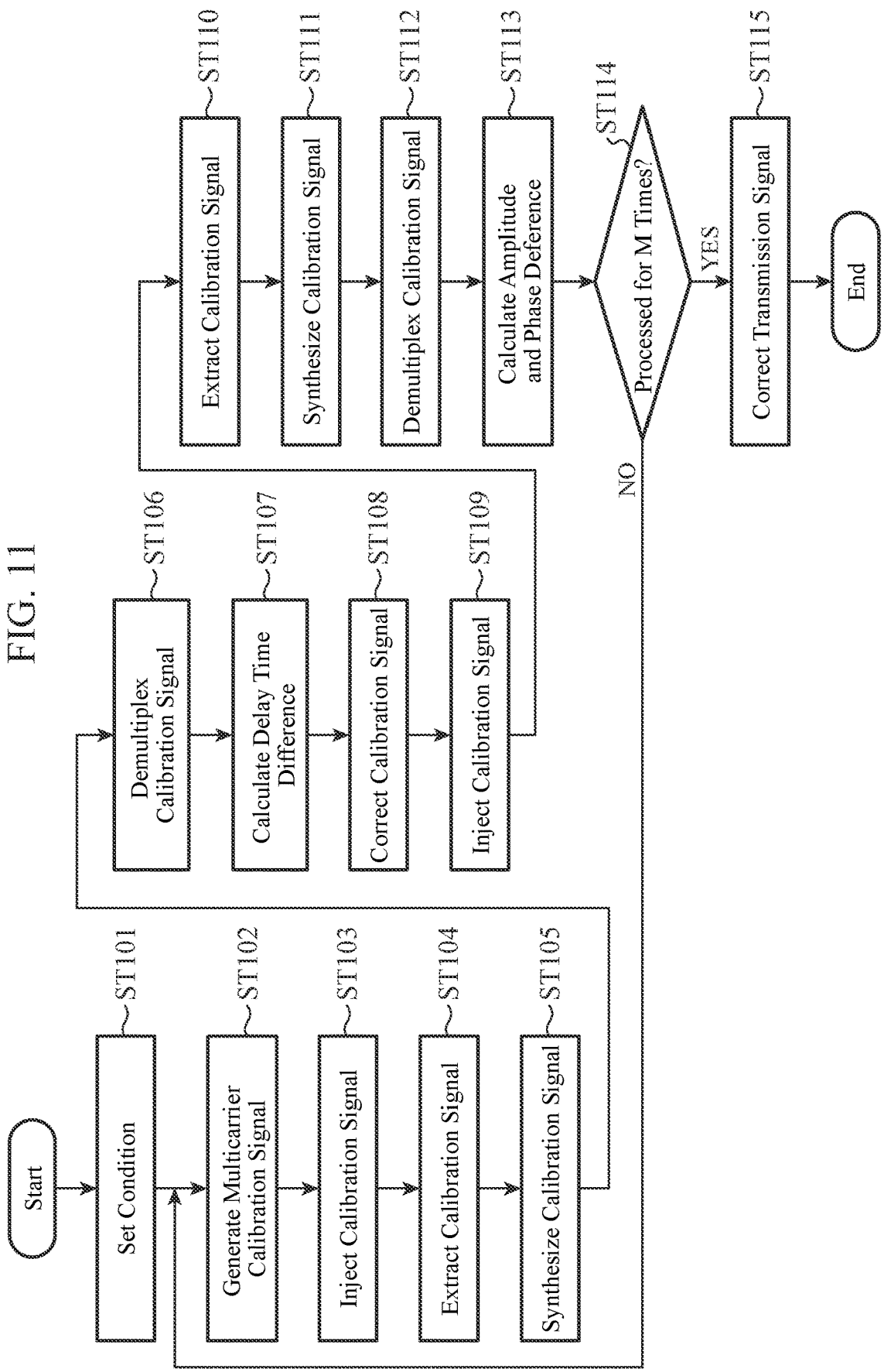
FIG. 11 is a flowchart illustrating a processing flow in a calibration device 200 of the array antenna according to the second embodiment of the invention.

The program stored in the memory is a program for executing the flowchart illustrating a processing flow of event recognition in the calibration device 200 illustrated in FIG. 11.

The flowchart illustrated in FIG. 11 includes a condition setting step ST101, a calibration signal stk generating step ST102, a calibration signal stk injecting step ST103, a calibration signal stlk extracting step ST104, a calibration signal stlk synthesizing step ST105, a synthesized calibration signal demultiplexing step ST106, a delay time difference calculating step ST107, a calibration signal stk correcting step ST108, a correction calibration signal stk injecting step ST109, a correction calibration signal stlk extracting step ST110, a correction calibration signal stlk synthesizing step ST111, a correction synthesized calibration signal demultiplexing step ST112, an amplitude and phase difference calculating step ST113, a processing count determining step ST114, and a transmission signal calibrating value CV generating step ST115.

Hereinafter, steps ST101 to ST115 will be described on the basis of the relationship with the components of the calibration device 200 illustrated in FIG. 9.

From the condition setting step ST101 to the calibration signal stlk extracting step ST104 are the same as the condition setting step ST1 to the calibration signal stlk extracting step ST4 in the calibration device 200 of the array antenna according to the first embodiment.

The calibration signal stlk synthesizing step ST105 is controlled by the power combining unit 80 in the configuration illustrated in FIG. 9.

In the calibration signal stlk synthesizing step ST105, the synthesized calibration signal S5 is generated by combining the power of the calibration signals stlk extracted in the calibration signal stlk extracting step ST4. Since the plurality of calibration signals stlk is in a radio frequency (RF) band, the power combining process is performed in the radio frequency (RF) band.

The synthesized calibration signal demultiplexing step ST106 is controlled by the demultiplexing unit 71 in the configuration illustrated in FIG. 9.

In the synthesized calibration signal demultiplexing step ST106, the synthesized calibration signal S5 obtained in the synthesizing step ST105 is frequency-converted, and the synthesized calibration signal S5 that is a digital signal after analog to digital conversion is obtained. This processed synthesized calibration signal S5 is Fourier-transformed, demultiplexed into subcarrier units, and grouped into the first frequency unit to which subcarrier symbols are assigned and the second frequency unit to which no subcarrier symbols are assigned (null carriers) to generate an adjustment signal S4.

The delay time difference calculating step ST107 is controlled by the calibration processing unit 60 in the configuration illustrated in FIG. 9.

In the delay time difference calculating step ST107, calibration values including a delay time difference (delay amount) are calculated using the adjustment signal S4 generated in the synthesized calibration signal demultiplexing step ST106, using the calibration signals stk generated in the calibration signal stk generating step ST102 as reference values.

In a case where there is a time delay difference (timing error) among the transmission signal processing systems of the plurality of antenna elements 1-$k$, as described in the first embodiment, the second frequency unit generates output in the synthesized calibration signal S5 as illustrated in FIG. 6. It is possible to estimate the delay amount for each of the transmission signal processing systems of the plurality of antenna elements 1-$k$ that minimizes, ideally to zero, the signal component generated in the second frequency unit.

That is, the transmission signal calibrating value CV relating to the delay amount is obtained by calculating the time difference at which the output power of the calibration signals in the second frequency unit is minimized.

The calibration signal stk correcting step ST108 is controlled by the multicarrier calibration signal generating unit 50 in the configuration illustrated in FIG. 9.

In the calibration signal stk correcting step ST108, delay adjustment is performed on the calibration signals stk from the multicarrier calibration signal generating unit 50 on the basis of the delay amount estimated (calculated) in the delay time difference calculating step ST107 to generate correction calibration signals stk.

From the correction calibration signal stk injecting step ST109 to the correction synthesized calibration signal demultiplexing step ST112, similar processing to that of the calibration signal stk injecting step ST103 to the synthesized calibration signal demultiplexing step ST106 is performed on the correction calibration signals stk.

The amplitude and phase difference calculating step ST113 is controlled by the calibration processing unit 60 in the configuration illustrated in FIG. 9.

In the amplitude and phase difference calculating step ST113, calibration values including variations in the amplitude and the phase, at the time when the correction calibration signals stk pass through the transmission signal processing system of the plurality of antenna elements 1-$k$, are calculated using the adjustment signal S4 generated in the synthesized calibration signal demultiplexing step ST106, using the correction calibration signals stk generated in the delay time difference calculating step ST107 as reference values.

The calculation of the amplitude and the phase differences is performed with the calibration signals stk corresponding to the transmission signal processing systems of the plurality of antenna elements 1-$k$, as described in the calibration value calculating step ST7 in the first embodiment.

In the second embodiment, calibration values are estimated which adjust the amplitude and phase differences for each of the plurality of antenna elements 1-$k$ so that the output power of the demultiplexed first frequency unit in the adjustment signal S4 is maximized, and that the amplitude and phase differences for each of the plurality of antenna elements 1-$k$ implement an ideal direction of a beam.

That is, the transmission signal calibrating value CV relating to the amplitude and phase differences is obtained by calculating the amplitude and phase differences at which the output power of the calibration signals in the first frequency unit that is obtained by calibrating the time difference is maximized.

In the processing count determining step ST114, whether or not steps ST102 to ST113 have been performed M times is determined. If the steps have not been performed M times, the procedure returns to the calibration signal stk generating step ST2 and is repeated. If the steps have been performed M times, the procedure proceeds to the transmission signal calibrating value CV generating step ST115.

In the transmission signal calibrating value CV generating step ST115, the transmission signal calibrating value CV is generated which is based on the final calibration values including the time difference and the amplitude and phase differences in the processing count determining step ST8.

The transmission signal calibrating value CV generated in the transmission signal calibrating value CV generating step ST115 is provided to the DBF unit 30 of the transmission means 100.

As a result, during normal operation of the transmission means 100, the plurality of antenna element transmission signals S2-$k$ from the DBF unit 30 are adjusted of the timing and the amplitude and phase differences by the transmission signal calibrating value CV, and then are output.

The calibration device 200 of the array antenna according to the second embodiment configured in this manner not only achieves similar effects to those of the calibration device 200 of the array antenna according to the first embodiment but also enables a simple configuration as the calibration device 200 since the power combining unit 80 combines the power of the plurality of calibration signals stlk extracted in the plurality of extraction units 2-$k$ to generate the synthesized calibration signal S5, which is subjected to the demultiplexing process in the demultiplexing unit 71, thereby allowing the number of signals for performing the calibration process to be reduced to one.

Note that the array antenna according to the second embodiment is a transmitting array antenna; however, the calibration device 200 illustrated in FIG. 9 is also applicable to a receiving array antenna as described in the first embodiment.

Third Embodiment

An array antenna according to a third embodiment of the invention will be described with reference to FIGS. 12 and 13.

A calibration device 200 of an array antenna according to the third embodiment of the invention does not include a plurality of extraction units 2-$k$ nor a power combining unit 80, but receives transmission radio waves based on a plurality of calibration signals stlk emitted from antenna elements 1-$k$ by a reception antenna 90, and inputs the calibration signals stlk in the received radio waves to a demultiplexing unit 71 via a reception unit 95, whereas, in the calibration device 200 of the array antenna according to the second embodiment, the plurality of extraction units 2-$k$ extracts the plurality of calibration signals stlk from the plurality of amplification units 3-$k$ in the transmission signal processing systems, and the plurality of calibration signals stlk are processed in the power combining unit 80, and then processed in the demultiplexing unit 71.

That is, the reception antenna 90 has the functions of the plurality of extraction units 2-$k$ and the power combining unit 80.

Figure 12:
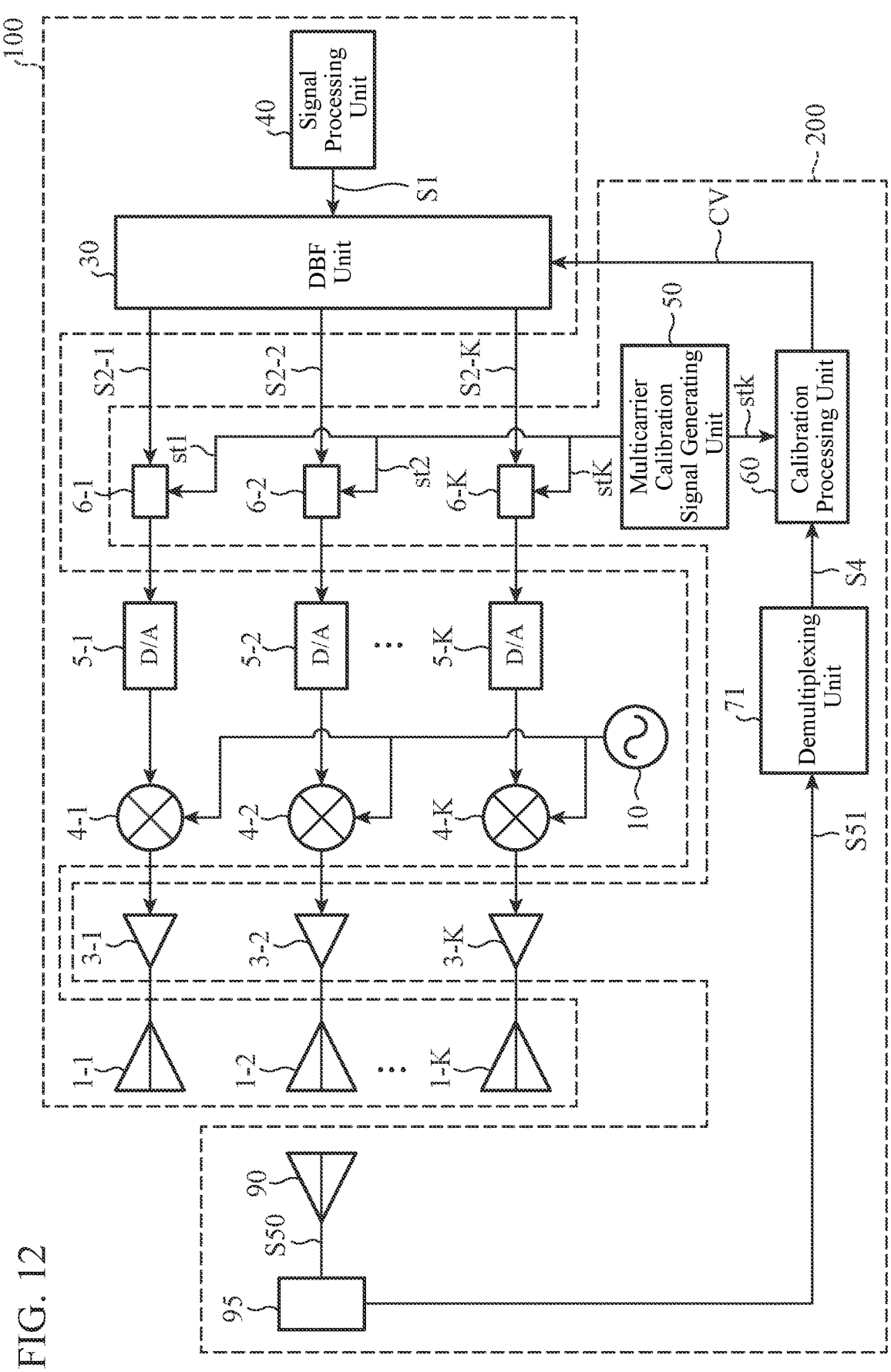
FIG. 12 is a configuration diagram illustrating an array antenna according to a third embodiment of the invention.
Figure 13:
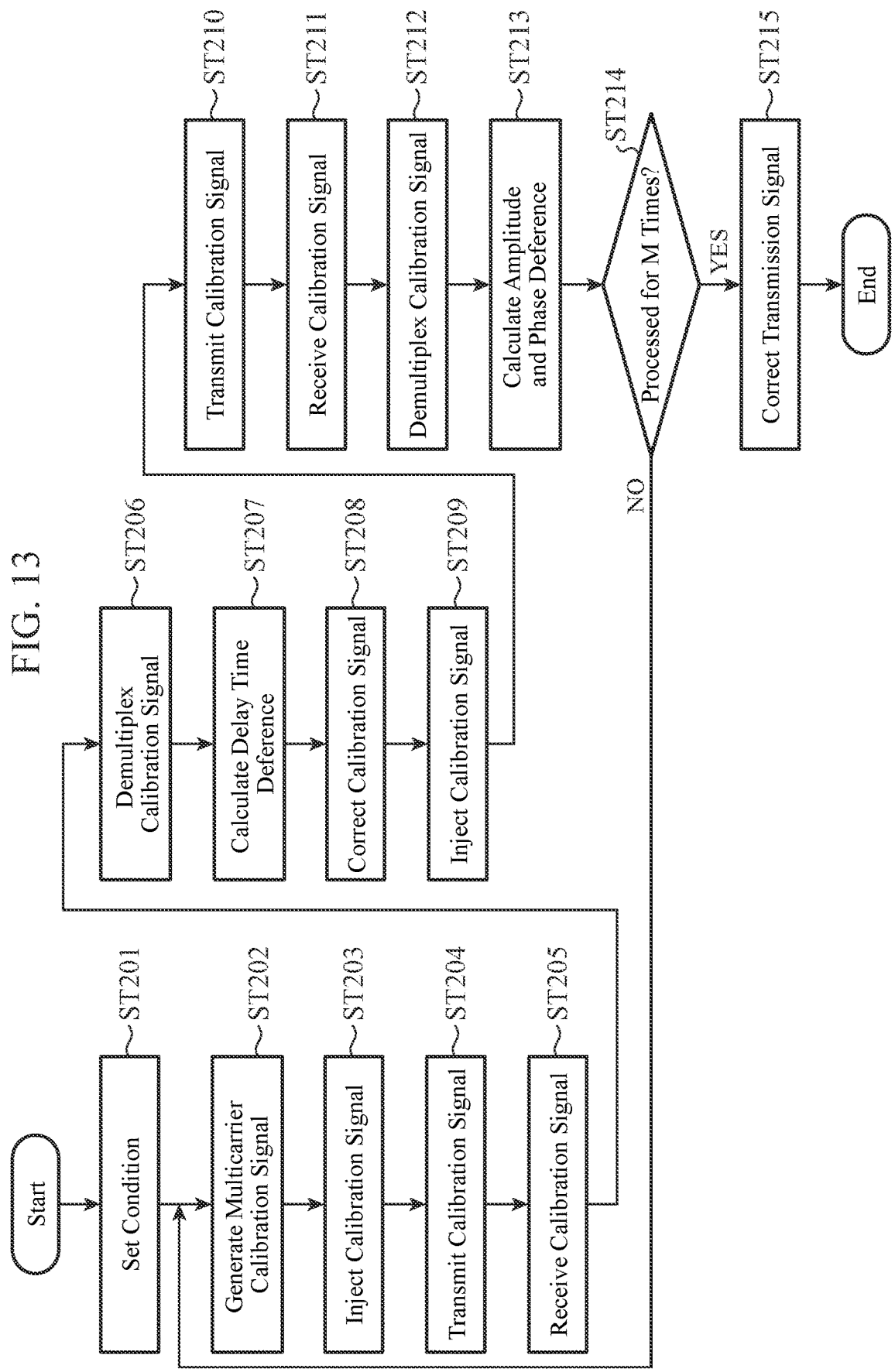
FIG. 13 is a flowchart illustrating a processing flow in a calibration device 200 of the array antenna according to the third embodiment of the invention.

Note that, in FIGS. 12 and 13, the same symbol as that in FIGS. 9 and 11 represents the same or a corresponding component.

Therefore, points different from the array antenna according to the second embodiment will be mainly described below.

The reception antenna 90 receives transmission radio waves based on a plurality of calibration signals stlk emitted from a plurality of antenna elements 1-$k$. To receive the transmission radio waves based on the plurality of calibration signals stlk emitted from the plurality of antenna elements 1-$k$ by the reception antenna 90 is to superimpose (combine) the signals of the respective antenna elements 1-$k$ using spatial propagation. That is, the plurality of calibration signals stlk received by the reception antenna 90 is input to the reception unit 95 as a result as a synthesized calibration signal S50 that is combined in a radio frequency (RF) band.

The reception unit 95 performs processing such as amplification and filtering on the synthesized calibration signal S50 from the reception antenna 90, and outputs a synthesized calibration signal S51 to the demultiplexing unit 71.

That is, the reception antenna 90 and the reception unit 95 are included in a reception means for receiving the plurality of calibration signals stlk in the transmission radio waves emitted from the plurality of antenna elements 1-$k$ and outputting the synthesized calibration signal S50.

The subsequent operations are similar to those of the second embodiment.

With this configuration, it suffices to perform processes after the demultiplexing unit 71 in the calibration device 200 only on one signal. Furthermore, it is possible to calibrate the amplitude and phase differences and the delay amount between the transmission signal processing systems including the plurality of antenna elements 1-$k$.

Although each component of the calibration device 200 is implemented by hardware, a part thereof may be a computer. That is, the calibration device 200 includes a memory including a storage unit, such as a ROM and a RAM, and a processor such as a CPU, and a program describing the processing content performed by the calibration device 200 is stored in the memory. The processor reads the program and executes the processing.

The program stored in the memory is a program for executing the flowchart illustrating a processing flow of event recognition in the calibration device 200 illustrated in FIG. 12.

The flowchart illustrated in FIG. 13 includes a condition setting step ST201, a calibration signal stk generating step ST202, a calibration signal stk injecting step ST203, a calibration signal stlk transmitting step ST204, a calibration signal stlk receiving step ST205, a synthesized calibration signal demultiplexing step ST206, a delay time difference calculating step ST207, a calibration signal stk correcting step ST208, a correction calibration signal stk injecting step ST209, a correction calibration signal stlk transmitting step ST210, a correction calibration signal stlk receiving step ST211, a correction synthesized calibration signal demultiplexing step ST212, an amplitude and phase difference calculating step ST213, a processing count determining step ST214, and a transmission signal calibrating value CV generating step ST215.

The calibration signal stlk transmitting step ST204, the calibration signal stlk receiving step ST205, the correction calibration signal stlk transmitting step ST210, and the correction calibration signal stlk receiving step ST211 correspond to the calibration signal stlk extracting step ST104, the calibration signal stlk synthesizing step ST105, the correction calibration signal stlk extracting step ST110, and the correction calibration signal stlk synthesizing step ST111 in the second embodiment, respectively, and similar processes are performed.

In the other steps, the same processes are performed as the other steps in the second embodiment.

The calibration device 200 of the array antenna according to the third embodiment configured in this manner not only achieves similar effects to those of the calibration device 200 of the array antenna according to the second embodiment, but also enables a simple configuration as the calibration device 200 since the reception antenna 90 and the reception unit 95 that are already included as the array antenna can be utilized without using the plurality of extraction units 2-$k$ nor the power combining unit 80.

In addition, there is an effect that the amplitude and phase differences and the delay amount over the entire transmission signal processing systems including the plurality of antenna elements 1-$k$ can be calibrated.

Note that the array antenna according to the third embodiment is a transmitting array antenna; however, the calibration device 200 illustrated in FIG. 12 is also applicable to a receiving array antenna as described in the first embodiment.

Fourth Embodiment

An array antenna according to a fourth embodiment of the invention will be described with reference to FIG. 14.

The array antenna according to the fourth embodiment of the invention is intended for an array antenna that performs analog beamforming, whereas the array antenna according to the second embodiment performs digital beamforming.

That is, it is only that the adjusting means of the delay and the phase difference are replaced from digital devices to analog devices, and the principle of calibration is basically the same, and thus there is no significant difference in the processing procedure. Note that the amplitude is rarely adjusted for each antenna element in analog beamforming; however, it can be implemented by variable attenuators or variable amplifiers.

Figure 14:
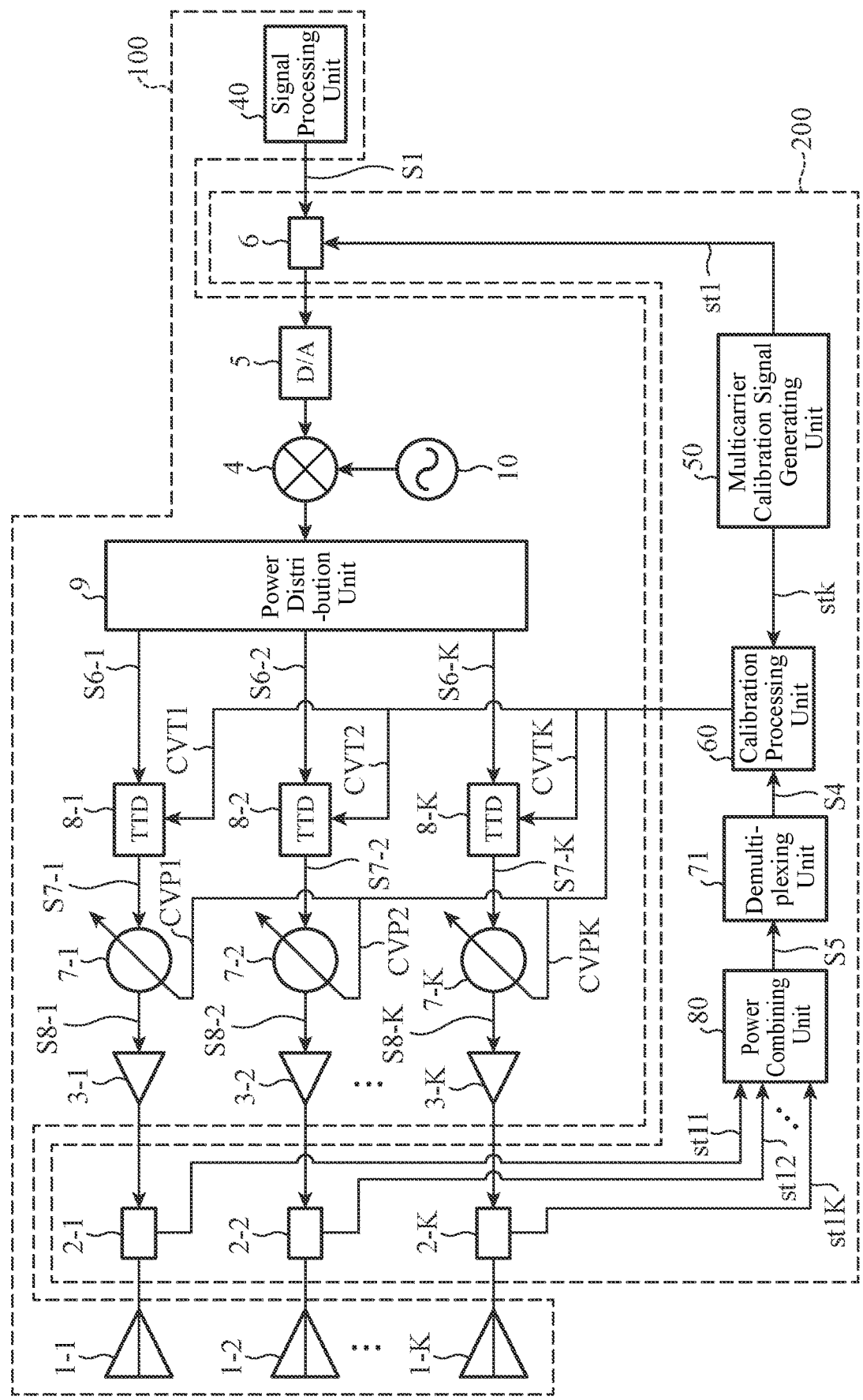
FIG. 14 is a configuration diagram illustrating an array antenna according to a fourth embodiment of the invention.

Note that, in FIG. 14, the same symbol as that in FIG. 9 represents the same or a corresponding component.

Therefore, points different from the array antenna according to the second embodiment will be mainly described below.

In FIG. 14, a transmission means 100, as a signal processing means, includes a plurality of antenna elements 1-$k$, a signal processing unit 40, a DA conversion unit 5, a UC unit 4, a power distribution unit 9, a plurality of true time delay (TTD) units 8-1 to 8-K, a plurality of phase shift units 7-1 to 7-K, a plurality of amplification units 3-1 to 3-K, and a local oscillator (hereinafter, referred to as an LO unit) 10.

A calibration device 200 includes a multicarrier calibration signal generating unit 50, an injection unit 6, a plurality of extraction units 2-1 to 2-K, a power combining unit 80, a demultiplexing unit 71, and a calibration processing unit 60.

Note that the plurality of TTD units 8-1 to 8-K, the plurality of phase shift units 7-1 to 7-K, the plurality of amplification units 3-1 to 3-K, and the plurality of extraction units 2-1 to 2-K are also hereinafter described as TTD units 8-$k$, phase shift units 7-$k$, amplification units 3-$k$, and extraction units 2-$k$, respectively, similarly to a plurality of antenna elements 1-$k$.

First, the transmission means 100 will be briefly described.

A transmission signal S1 from the signal processing unit 40 is digital-to-analog converted from a digital value to an analog value in the DA conversion unit 5, frequency-converted into a radio frequency (RF) band in the UC unit 4 on the basis of the oscillation frequency from the LO unit 10, then is input to the power distribution unit 9.

The power distribution unit 9 distributes the transmission signal S1 input via the DA conversion unit 5 and the UC unit 4 into a plurality of antenna element transmission signals S6-$k$ corresponding to the plurality of antenna elements 1-$k$.

The plurality of antenna element transmission signals S6-$k$ distributed by the power distribution unit 9 is adjusted of the time difference in the plurality of TTD units 8-$k$ on the basis of data signal calibrating values CVTk indicating the delay amount (time difference) that is provided from the calibration device 200, thereby a plurality of antenna element transmission signals S7-$k$ is output.

The plurality of phase shift units 7-$k$ adjust the amplitude and phase differences in the plurality of antenna element transmission signals S7-$k$, in which the time difference has been adjusted by the plurality of TTD units 8-$k$, on the basis of data signal calibrating values CVPk indicating the amplitude and phase differences that are provided from the calibration device 200, and thereby output a plurality of antenna element transmission signals S8-$k$ in which the amplitude and phase differences are adjusted.

The plurality of amplification units 3-$k$ amplifies the plurality of antenna element transmission signals S8-$k$ in which the amplitude and phase differences are adjusted by the plurality of phase shift units 7-$k$.

The plurality of antenna element transmission signals S8-$k$ amplified by the plurality of amplification units 3-$k$ is input to the respective antenna elements 1-$k$, and is emitted from the respective antenna elements 1-$k$ as transmission radio waves.

Next, the calibration device 200 will be described.

The plurality of extraction units 2-$k$, the power combining unit 80, and the demultiplexing unit 71 are the same as those in the second embodiment. A plurality of calibration signals stlk amplified by the plurality of amplification units 3-$k$ is extracted by the plurality of extraction units 2-$k$, and the power combining unit 80 combines the power thereof to generate a synthesized calibration signal S5.

The demultiplexing unit 71 performs grouping on demultiplexed subcarriers on the basis of the synthesized calibration signal S5 into the first frequency unit to which subcarrier symbols are assigned and the second frequency unit to which no subcarrier symbols are assigned (null carriers), and outputs, as an adjustment signal S4, to the calibration processing unit 60.

The multicarrier calibration signal generating unit 50 generates a plurality of calibration signals stk based on multicarrier signals to which a plurality of subcarriers is assigned, the subcarriers being different for each of the plurality of antenna elements 1-*k*, and including a first frequency unit of a subcarrier to which one of the plurality of antenna elements 1-*k* is assigned and a second frequency unit not assigned as a subcarrier. The calibration signals stl generated by the multicarrier calibration signal generating unit 50 are injected into the DA conversion unit 5 via the injection unit 6.

Furthermore, the plurality of calibration signals stk generated by the multicarrier calibration signal generating unit 50 is input to the calibration processing unit 60.

The calibration processing unit 60 obtains calibration values (amplitude and phase differences, delay amount) for calibrating the amplitude and phase differences and the time difference between the transmission signal processing systems due to passage through the transmission signal processing systems of the plurality of antenna elements 1-*k* using the adjustment signal S4 that is the signal demultiplexed in the demultiplexing unit 71 using the calibration signals stk generated in the multicarrier calibration signal generating unit 50 as reference values, provides the data signal calibrating values CVTk indicating the delay amount (time difference) based on the obtained calibration values for the delay amount to the plurality of TTD units 8-*k* in the transmission means 100, and provides the data signal calibrating values CVPk indicating the amplitude and phase differences based on the obtained calibration values for the amplitude and phase differences to the plurality of phase shift units 7-*k*.

The calibration device 200 of an array antenna according to the fourth embodiment configured in this manner achieves similar effects to those of the calibration device 200 of an array antenna according to the second embodiment that performs digital beamforming with respect to an array antenna that performs analog beamforming.

Note that the array antenna according to the fourth embodiment is a transmitting array antenna; however, the calibration device 200 illustrated in FIG. 14 is also applicable to a receiving array antenna as described in the first embodiment.

Note that the present invention may include a flexible combination of the embodiments, a modification of any component of the embodiments, or an omission of any component in the embodiments within the scope of the present invention.

REFERENCE SIGNS LIST

100: transmission means, 200: calibration device, 1-1 to 1-K: antenna element, 2-1 to 2-K: extraction unit, 3-1 to 3-K: amplification unit, 4-1 to 4-K, 4: UC unit, 5-1 to 5-K, 5: DA conversion unit, 6-1 to 6-K, 6: injection unit, 7-1 to 7-K: phase shift unit, 8-1 to 8-K: TTD unit, 10: LO unit, 30: DBF unit, 40: signal processing unit, 50: multicarrier calibration signal generating unit, 60: calibration processing unit, 70, 71: demultiplexing unit, 80: power combining unit, 90: reception antenna, 95: reception unit

The invention claimed is:

1. A calibration device of an array antenna for a transmitter comprising a plurality of antenna elements and transmission signal processing systems corresponding to the plurality of antenna elements, wherein an antenna element transmission signal is calibrated for amplitude and phase differences and a time difference for each of the antenna elements on a basis of a transmission signal calibrating value, the transmitter being for generating a plurality of transmission radio waves applied with amplitude and phase differences and a time difference corresponding to each of the plurality of antenna elements and emitting the transmission radio waves from the respective antenna elements, the calibration device comprising:

a multicarrier calibration signal generator to generate a plurality of calibration signals based on a plurality of subcarriers including a first frequency unit of a subcarrier to which a subcarrier symbol is assigned and a second frequency unit not assigned a subcarrier symbol, the plurality of calibration signals being different for each of the plurality of antenna elements;

an injector to inject a plurality of calibration signals generated by the multicarrier calibration signal generator into the transmitter in correspondence to the transmission signal processing systems of the plurality of antenna elements;

an extractor to extract calibration signals processed by the transmission signal processing systems of the plurality of antenna elements;

a synthesizer to generate a synthesized calibration signal by combining power of the calibration signals of the respective antenna elements extracted by the extractor;

a demultiplexer to demultiplex the synthesized calibration signal generated by the synthesizer into a first frequency unit of an assigned subcarrier and a second frequency unit not assigned as a subcarrier; and a calibration processor to obtain a calibration value for calibrating the amplitude and phase differences and the time difference between the transmission signal processing systems of the plurality of antenna elements using the signals demultiplexed by the demultiplexer, and providing the transmission signal calibrating value based on the obtained calibration value to the transmitter.

2. The calibration device of an array antenna according to claim 1, wherein the calibration value for calibrating the time difference in the calibration processor is calculated from output power of the second frequency unit demultiplexed by the demultiplexer.

3. The calibration device of an array antenna according to claim 1, wherein the plurality of calibration signals generated by the multicarrier calibration signal generator are calibrated by an orthogonal frequency division multiplex signal including two or more data symbols.

4. A calibration device of an array antenna for a transmitter comprising a plurality of antenna elements and transmission signal processing systems corresponding to the plurality of antenna elements, wherein an antenna element transmission signal is calibrated for amplitude and phase differences and a time difference for each of the antenna elements on a basis of a transmission signal calibrating value, the transmitter for generating a plurality of transmission radio waves applied with amplitude and phase differences and a time difference corresponding to each of the plurality of antenna elements and emitting the transmission radio waves from the respective antenna elements, the calibration device comprising:

a multicarrier calibration signal generator to generate a plurality of calibration signals based on a plurality of subcarriers including a first frequency unit of a subcarrier to which a subcarrier symbol is assigned and a second frequency unit not assigned a subcarrier symbol, the plurality of calibration signals being different for each of the plurality of antenna elements;

an injector to inject a plurality of calibration signals generated by the multicarrier calibration signal generator into the transmitter in correspondence to the transmission signal processing systems of the plurality of antenna elements;

a receptor to receive a plurality of calibration signals in transmission radio waves emitted from the plurality of antenna elements and outputting a synthesized calibration signal;

a demultiplexer to demultiplex the synthesized calibration signal from the receptor into a first frequency unit of an assigned subcarrier and a second frequency unit not assigned as a subcarrier; and a calibration processor to obtain a calibration value for calibrating the amplitude and phase differences and the time difference between the transmission signal processing systems of the plurality of antenna elements using the signals demultiplexed by the demultiplexer, and providing the transmission signal calibrating value based on the obtained calibration value to the transmitter.

5. The calibration device of an array antenna according to claim 4, wherein the calibration value for calibrating the time difference in the calibration processor is calculated from output power of the second frequency unit demultiplexed by the demultiplexer.

6. The calibration device of an array antenna according to claim 4, wherein the plurality of calibration signals generated by the multicarrier calibration signal generator are calibrated by an orthogonal frequency division multiplex signal including two or more data symbols.

7. An array antenna comprising:
a transmitter comprising: a plurality of antenna elements; a digital beamformer to generate a plurality of antenna element transmission signals, in which amplitude and phase differences and time differences corresponding to the respective antenna elements are calibrated, from a transmission signal that is a baseband signal on a basis of a transmission signal calibrating value and outputting the plurality of antenna element transmission signals; a digital to analog converter to receive the plurality of antenna element transmission signals from the digital beamformer and perform digital to analog conversion on each of the baseband signals of the plurality of antenna element transmission signals; an up converter to frequency-converting each of the plurality of antenna element transmission signals that is digital-to-analog converted from a digital value to an analog value by the digital to analog converter into a radio frequency band; and an amplifier to power amplify each of the plurality of antenna element transmission signals that is frequency-converted by the up converter and outputting the plurality of antenna element transmission signals power-amplified to the respective antenna elements; and a calibration device comprising: a multicarrier calibration signal generator to generate a plurality of calibration signals based on a plurality of subcarriers including a first frequency unit of a subcarrier to which a subcarrier symbol is assigned and a second frequency unit not assigned a subcarrier symbol, the plurality of calibration signals being different for each of the plurality of antenna elements; an injector to output the plurality of calibration signals from the multicarrier calibration signal generator to the digital to analog converter; an extractor to extract the plurality of calibration signals output from the amplifier; a demultiplexer to demultiplex the plurality of calibration signals extracted by the extractor to a frequency unit of an assigned subcarrier and a frequency unit not assigned as a subcarrier; and a calibration processor to obtain a calibration value for calibrating the amplitude and phase differences and the time differences between transmission signal processing systems of the plurality of antenna elements using the signals demultiplexed by the demultiplexers, and providing the transmission signal calibrating value based on the obtained calibration value to the digital beamformer.

8. A calibration method of an array antenna, the calibration method comprising:
generating step of generating a plurality of calibration signals based on a plurality of subcarriers including a first frequency unit of a subcarrier to which a subcarrier symbol is assigned and a second frequency unit not assigned a subcarrier symbol, the plurality of calibration signals being different for each of the plurality of antenna elements;

injecting a plurality of calibration signals generated into input ends of transmission signal processing systems corresponding to the plurality of antenna elements;

extracting calibration signals processed by the transmission signal processing systems of the plurality of antenna elements;

generating a synthesized calibration signal by combining power of the calibration signals of the respective antenna elements extracted;

demultiplex the synthesized calibration signal generated into a first frequency unit of an assigned subcarrier and a second frequency unit not assigned as a subcarrier; and obtaining a calibration value for calibrating amplitude and phase differences and a time difference between the transmission signal processing systems of the plurality of antenna elements using the signals demultiplexed, and providing a data signal calibrating value based on the obtained calibration value to a transmission means corresponding to the plurality of antenna elements.

9. The calibration method of an array antenna according to claim 8, wherein the calibration value for calibrating the time difference is calculated from output power of the second frequency unit demultiplexed.

10. The calibration method of an array antenna according to claim 8, wherein the plurality of calibration signals generated are calibrated by an orthogonal frequency division multiplex signal including two or more data symbols.

11. A calibration method of an array antenna, the calibration method comprising:
generating a plurality of calibration signals based on a plurality of subcarriers including a first frequency unit of a subcarrier to which a subcarrier symbol is assigned and a second frequency unit not assigned a subcarrier symbol, the plurality of calibration signals being different for each of the plurality of antenna elements;

injecting a plurality of calibration signals generated into input ends of transmission signal processing systems corresponding to the plurality of antenna elements;

receiving a plurality of calibration signals in transmission radio waves emitted from the plurality of antenna elements and outputting a synthesized calibration signal;

demultiplexing the synthesized calibration signal generated into a first frequency unit of an assigned subcarrier and a second frequency unit not assigned as a subcarrier; and obtaining a calibration value for calibrating amplitude and phase differences and a time difference between the transmission signal processing systems of the plurality of antenna elements using the signals demultiplexed, and providing a data signal calibrating value based on the obtained calibration value to a transmission means corresponding to the plurality of antenna elements.

12. The calibration method of an array antenna according to claim 11, wherein the calibration value for calibrating the time difference is calculated from output power of the second frequency unit demultiplexed.

13. The calibration method of an array antenna according to claim 11, wherein the plurality of calibration signals generated are calibrated by an orthogonal frequency division multiplex signal including two or more data symbols.

* * * * *